(12) United States Patent
Oteki

(10) Patent No.: US 8,599,416 B2
(45) Date of Patent: Dec. 3, 2013

(54) IMAGE FORMING APPARATUS, IMAGE FORMING METHOD AND COMPUTER READABLE INFORMATION RECORDING MEDIUM

(75) Inventor: Sugitaka Oteki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/410,524

(22) Filed: Mar. 2, 2012

(65) Prior Publication Data

US 2012/0162717 A1     Jun. 28, 2012

(30) Foreign Application Priority Data

May 15, 2007   (JP) ................................ 2007-129472
Feb. 15, 2008  (JP) ................................ 2008-034879

(51) Int. Cl.
*H04N 1/40* (2006.01)

(52) U.S. Cl.
USPC ........................................ 358/1.15; 358/468

(58) Field of Classification Search
USPC ......... 358/1.9, 2.1, 1.13–1.17, 3.26, 524, 468
See application file for complete search history.

(56) References Cited

U.S. PATENT DOCUMENTS

| | | | |
|---|---|---|---|
| 5,199,101 A | 3/1993 | Cusick et al. | |
| 5,732,196 A | 3/1998 | Watanabe | |
| 5,816,714 A | 10/1998 | Hori | |
| 6,665,082 B1 | 12/2003 | Takeoka et al. | |
| 2006/0259804 A1 | 11/2006 | Fry | |

FOREIGN PATENT DOCUMENTS

| | | |
|---|---|---|
| JP | 2000-316063 | 11/2000 |
| JP | 2004-112692 | 4/2004 |

OTHER PUBLICATIONS

Japanese Office Action mailed Sep. 6, 2011.

*Primary Examiner* — Thomas D Lee
*Assistant Examiner* — Stephen M Brinich
(74) *Attorney, Agent, or Firm* — IPUSA, PLLC

(57) ABSTRACT

An image forming apparatus transfers image data stored in a first storing part of a side of a first control part to a side of a writing engine. A second storing part temporarily stores the image data from said first storing part. When data stored in the second storing part reaches a data amount to be previously stored in order that continuous transfer of the image data to the side of the writing engine from the second storing part is available at a predetermined transfer rate, even when a predetermined delay occurs in a transfer operation of the image data from the first storing part to the second storing part, reading of the image data from the second storing part is started for starting image forming operation.

17 Claims, 23 Drawing Sheets

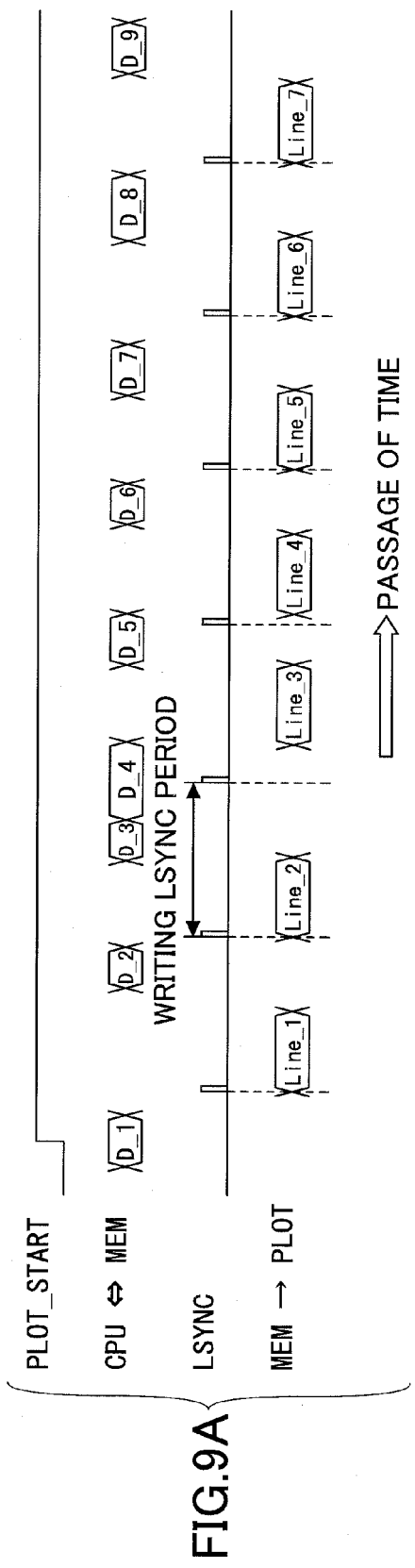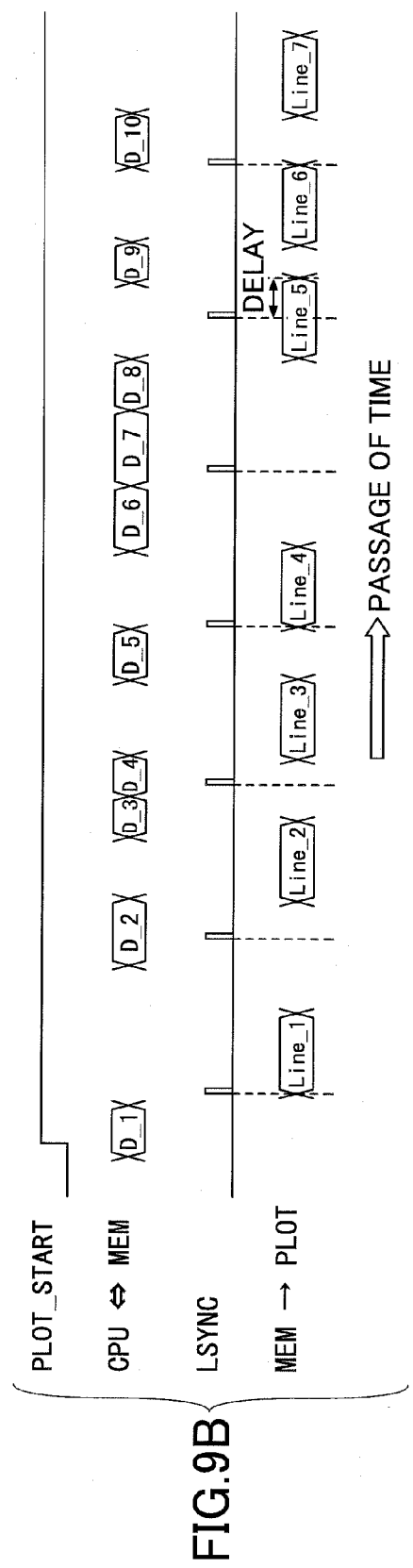

IN CASE OF NORMAL PLOTTING

IN CASE OF DEFECTIVE PLOTTING (LINE SHIFT)

IN CASE OF DEFECTIVE PLOTTING (LINE DRAGGING)

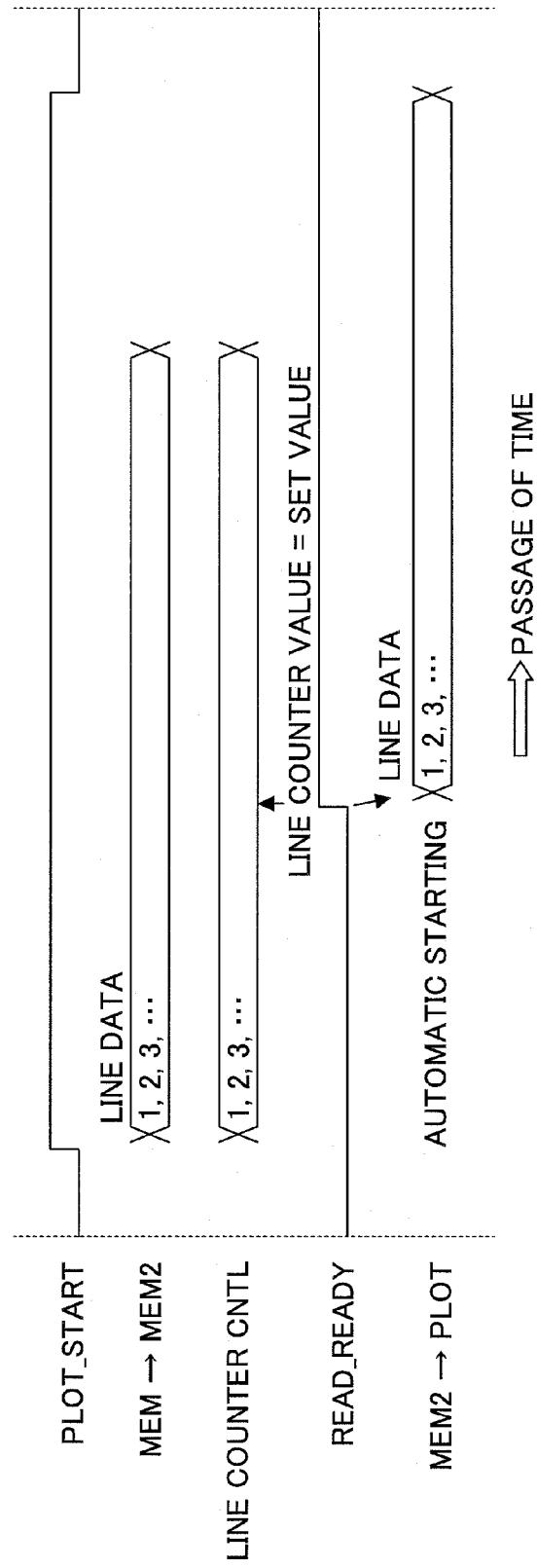

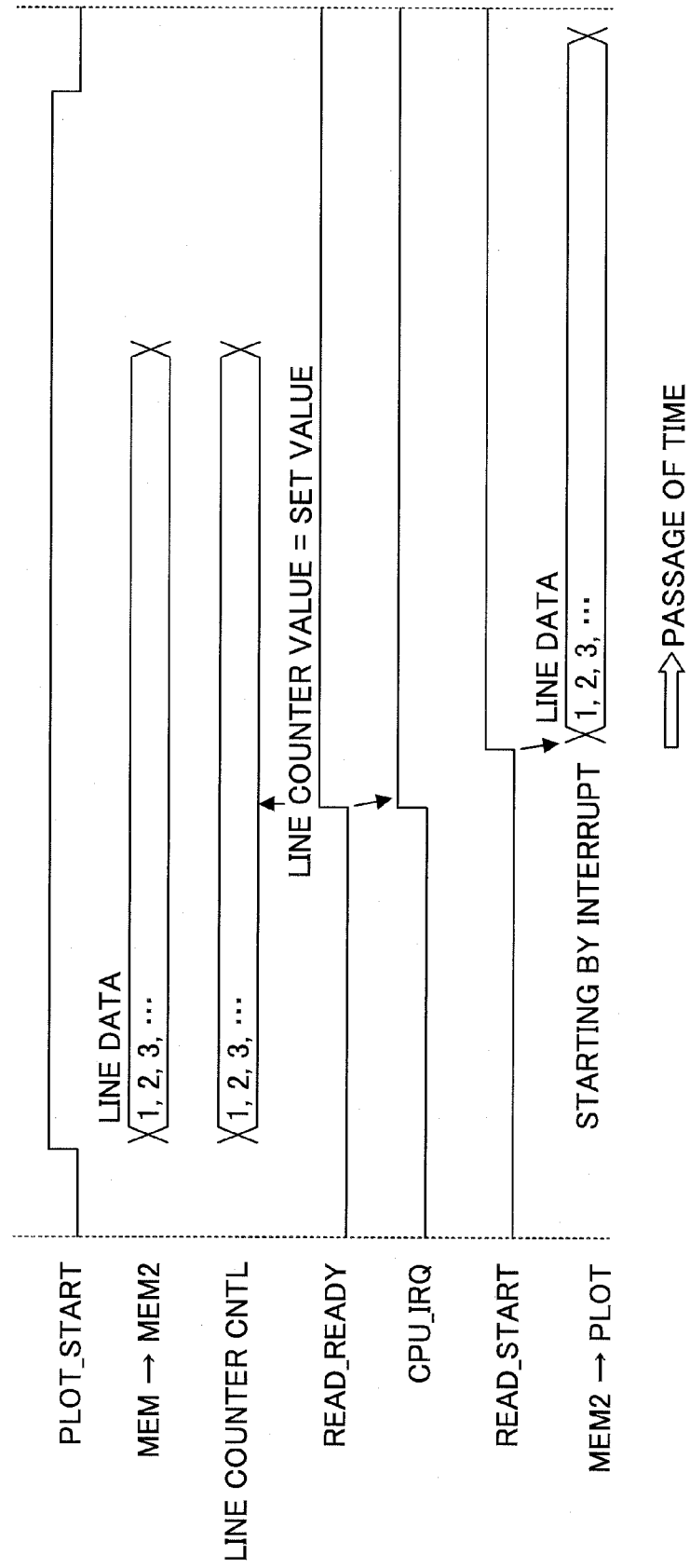

IMAGE FORMING APPARATUS, IMAGE FORMING METHOD AND COMPUTER READABLE INFORMATION RECORDING MEDIUM

CROSS-REFERENCE TO RELATED APPLICATION

This application is a continuation patent application of, and claims the benefit of and priority to U.S. patent application Ser. No. 12/149,120 filed on Apr. 28, 2008, which is based on and claims the benefit of priority of Japanese applications Nos. 2007-129472 and 2008-034879, filed May 15, 2007 and Feb. 15, 2008, respectively, with the Japanese Patent Office, all of which are hereby incorporated by reference.

BACKGROUND OF THE INVENTION

1. Field of the Invention

The present invention relates to an image forming apparatus and an image forming method for reproducing from an image signal a visible image on a recording medium, and a computer readable information recording medium storing therein a program for controlling operation of the image forming apparatus.

2. Description of the Related Art

An image forming apparatus, processing an image signal to form a printed image on a recording medium such as a printing paper sheet or such, is practically used in a copier, a facsimile machine, a printer, or in a MFP (Multi-Function Peripheral), which has functions of a copier, a facsimile machine, a printer and a scanner in a single machine. For example, Japanese Laid-Open Patent Application No. 2000-316063 discloses an image processing apparatus or an image forming apparatus which reads an image from a scanner, and reproduces the image on a printing paper sheet.

FIG. 17 shows a block diagram of such an image forming apparatus.

The image forming apparatus shown in FIG. 17 includes a reading unit 101, a sensor board unit (hereafter referred to as SBU) 102, compression/decompression and data interface control part (hereafter referred to as CDIC) 103, an image processing processor (hereafter referred to as IPP) 104, a video data control part (hereafter referred to as VDC) 105, and an image forming unit 106.

The reading unit 101 optically reads an original (i.e., an original image). The SBU 102 converts an electrical signal obtained from the original by means of a photosensitive device (in this embodiment, a CCD) of the reading unit 101, into a digital signal, and outputs the same. The CDIC 103 controls transmission of image data between respective functional devices and data buses. The IPP 104 corrects signal degradation possibly occurring in the optical system and signal degradation (referred to as signal degradation in the scanner system) possibly occurring in quantization to obtain the digital signal. The VDC 105 carries out dot re-arrangement and pulse control. The image forming unit 106 forms a printed image on a printing paper sheet.

Further, the image forming apparatus includes a process controller 111, a RAM 112 and a ROM 113. The process controller 111 controls a flow of image data transferred through a CPU bus 110. Further, the image forming apparatus includes an image memory access control part (hereafter, referred to as IMAC) 121, a memory module (hereafter, referred to as MEM) 122, an external personal computer (hereafter, referred to as PC) 123, a facsimile control unit (hereafter, referred to as FCU) 124, a public telephone line/network (hereafter, referred to as PN) 125, a system controller 131, a RAM 132, a ROM 133 and an operation part 134.

The IMAC 121 carries out access control for image data to a main memory, extension of data for printing, and compression/decompression of image data for effectively utilizing memory resources. The MEM 122 acts as the main memory. The system controller 131 is connected with the IMAC 121.

The image signal converted into an electrical signal by the CCD of the reading unit 101 is converted into a digital signal as mentioned above. After that, the digital signal (i.e., image signal) is output from the SBU 102. The image signal thus output from the SBU 102 is input to the CDIC 103. Transmission of image data of the image signal between the functional devices and the data buses is controlled by the CDIC 103 as mentioned above. The CDIC carries out data transfer for the image data between the SBU 102, the parallel bus 120 and the IPP 104, and carries out communication of the image data between the system controller 131 and the process controller 111. The system controller 131 carries out total control of the image forming apparatus.

The image data from the SBU 102 is transferred to the IPP 104 via the CDIC 103, corrections of degradation in the optical signal and the degradation in the scanner system are carried out on the image data, and after that, the image data is output to the CDIC 103. The image data thus transferred to the CDIC 103 from the IPP 104 is then transferred to the IMAC 121 via the parallel bus 120 from the CDIC 103. There, under the control of the system controller 131, access control of the image data to the MEM 122, extension of image data given by the PC 123 for printing, and compression/decompression of the image data are carried out. Specifically, the image data thus transferred to the IMAC 121 is stored in the MEM 122 after being compressed, and the data thus stored in the MEM 122 is then read out as is necessary. The thus read data is then decompressed, and then, the image data is returned to the CDIC 103 via the parallel bus 120 from the IMAC 121.

The image data is then transferred to the IPP 104 from the CDIC 103, and after that, an image quality process is carried out. Further, pulse control is carried out by the VDC 105. Then, the image data is sent to the image forming unit 106 which forms a printed image on a printing paper sheet. In this configuration, the parallel bus 120 and the CDIC 103 carry out bus control so that a flow of the image data is appropriately controlled. Thus, the image forming apparatus may act as an MFP.

However, for example, an error of caching of a program or data may occur in the system controller 131. In this case, data access is carried out frequently from the system controller 131 to the main memory 122. As a result, each line data (i.e., the above-mentioned image data) may not be positively transferred to the CDIC 130 within a predetermined writing LSYNC period. As a result, a defect may occur in a printed image formed on a printing paper sheet by the image forming unit 106. It is noted that the above-mentioned LSYNC means, as will be described later, a line synchronization signal, and the writing LSYNC period means a period of successively generated LSYNC for writing.

In consideration of the above-mentioned situation, an object of the present invention is to avoid generation of a defective printed image even when data transfer is carried out frequently to a main memory from a control part, such as the above-mentioned system controller 131, for example.

SUMMARY OF THE INVENTION

In order to achieve an object of the invention, an image forming apparatus, which transfers plot data (i.e., image data)

stored in a first storing part of a side of a controller to a side of a writing engine, for obtaining an image from the writing engine, includes, the first storing part; the controller; the writing engine; a second storing part configured to temporarily store the plot data from said first storing part; and a reading part configured to start reading the plot data from the second storing part for starting image forming operation, when data stored in the second storing part reaches a data amount to be previously stored in order that continuous transfer of the plot data to the side of the writing engine from the second storing part is available at a predetermined transfer rate even when a predetermined delay occurs in a transfer operation of the plot data from the first storing part to the second storing part.

In this configuration, even when the predetermined delay occurs in transfer operation from the first storing part to the second storing part after reading of the plot data from the second storing part is started, the plot data can be positively transferred from the second storing part to the side of the writing engine continuously at the predetermined transfer rate. As a result, each line data of the plot data can be positively transferred within predetermined writing LSYNC period to the side of the writing engine. As a result, it is possible to avoid generation of a defective printed image.

When the predetermined delay occurs in the transfer operation from the first storing part to the second storing part, as mentioned above, after reading of the plot data from the second storing part to the side of the writing engine is started, a data amount transferred from the first storing part and stored in the second storing part per unit of time may become smaller than the predetermined data transfer rate from the second storing part to the side of the writing engine. As a result, a data amount stored in the second storing part reduces gradually. If the data amount stored in the second storing part thus reduces becomes zero, transfer of the plot data to the side of the writing engine from the second storing part is interrupted, which may cause a defect in a printed image resulting from the image forming operation carried out on the side of the writing engine. In order to avoid such a situation, a predetermined data amount is stored in the second storing part before image forming operation is actually started. As mentioned above, the reading part is configured to start reading the plot data from the second storing part for starting image forming operation, when data stored in the second storing part reaches a data amount to be previously stored in order that continuous transfer of the plot data to the side of the writing engine from the second storing part is available at the predetermined transfer rate, even when the predetermined delay occurs in the transfer operation of the plot data from the first storing part to the second storing part.

Other objects, features and advantages of the present invention will become more apparent from the following detailed description when read in conjunction with the accompanying drawings.

BRIEF DESCRIPTION OF THE DRAWINGS

FIGS. 9A and 9B show timing charts in a case where printing is carried out from a PC in the configuration of FIG. 17;

FIG. 11 shows a state of reading control from the second MEM;

FIG. 12 shows a state where reading from the second MEM is started;

DETAILED DESCRIPTION OF THE PREFERRED EMBODIMENTS

Figure 1:
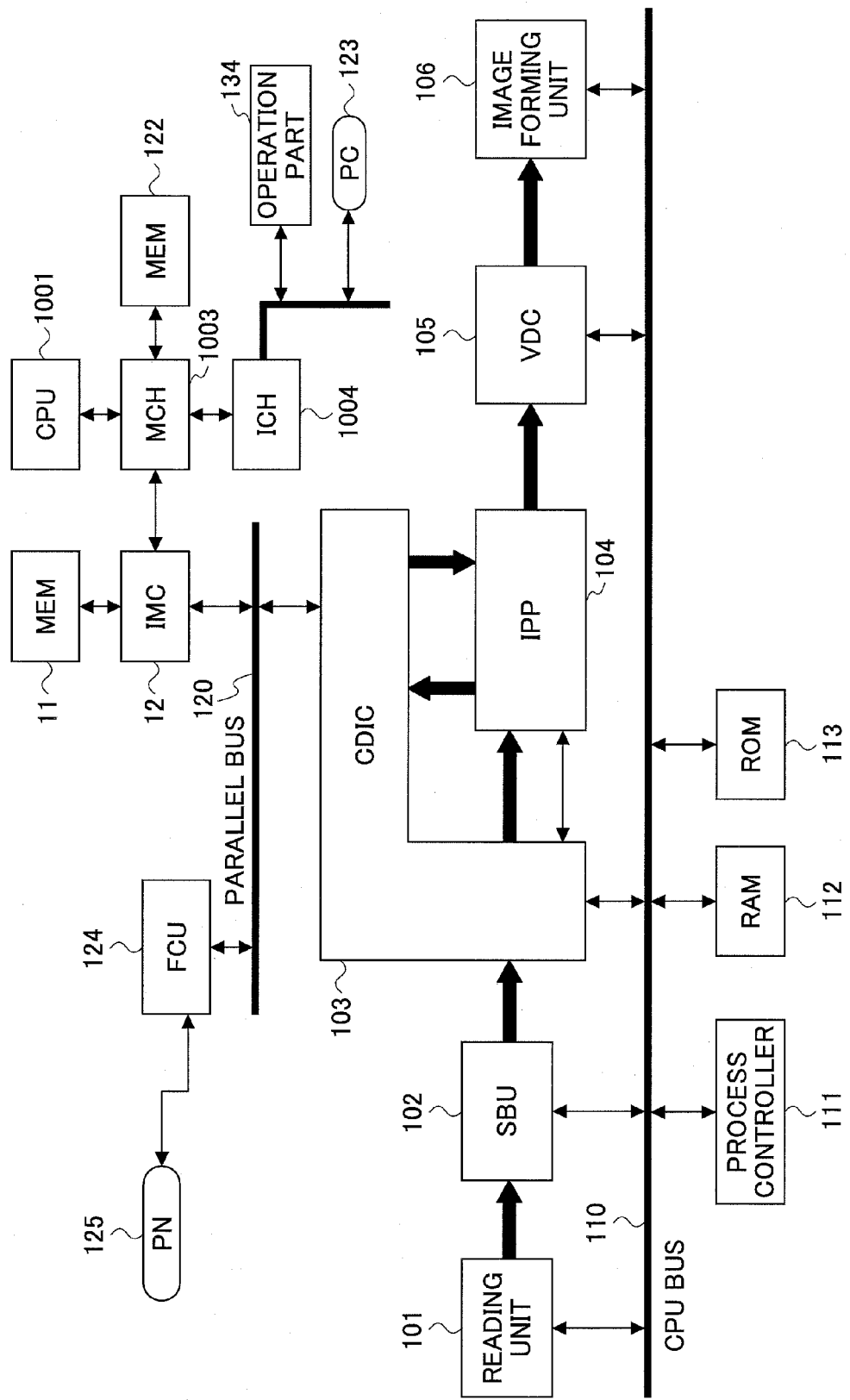
FIG. 1 shows a block diagram of an image forming apparatus in an embodiment 1 of the present invention.

According to an embodiment of the present invention, an image forming apparatus, transferring plot data stored in a first storing part of a side of a controller to a side of a writing engine, for obtaining an image from the writing engine, includes the first storing part; the controller; the writing engine; a second storing part configured to temporarily store the plot data from said first storing part; and a reading part configured to start reading the plot data from the second storing part for starting image forming operation, when data stored in the second storing part reaches a data amount to be previously stored in order that continuous transfer of the plot data to the side of the writing engine from the second storing part is available at a predetermined transfer rate, even when a predetermined delay occurs in transfer operation of the plot data from the first storing part to the second storing part.

It is preferable that the reading part starts reading of the plot data from the second storing part to provide the plot data to the side of the writing engine when the plot data stored in the second storing part reaches a predetermined number of lines after data transfer of the plot data from the first storing part to the second storing part having started in response to an image forming start directing signal.

It is also preferable that an interrupt signal is output from the side of the controller when the plot data stored in the second storing part reaches the predetermined number of lines, and the reading part starts reading the plot data from the second storing part in response to the interrupt signal.

It is also preferable that the image forming start directing signal is output from an operation panel, or from a personal computer connected to the image forming apparatus through a communication part.

It is also preferable that the image forming operation is carried out by means of transfer of an image, once formed on a photosensitive drum or such, to a printing paper sheet.

Below, embodiments 1 and 2 of the present invention will be described with reference to figures. In a description below, the same reference numerals are given to parts/components substantially the same as those of the related art mentioned above with reference to FIG. 17, and duplicate description may be omitted.

FIG. 1 shows a block diagram of an image forming apparatus in an embodiment 1 of the present invention.

Figure 17:
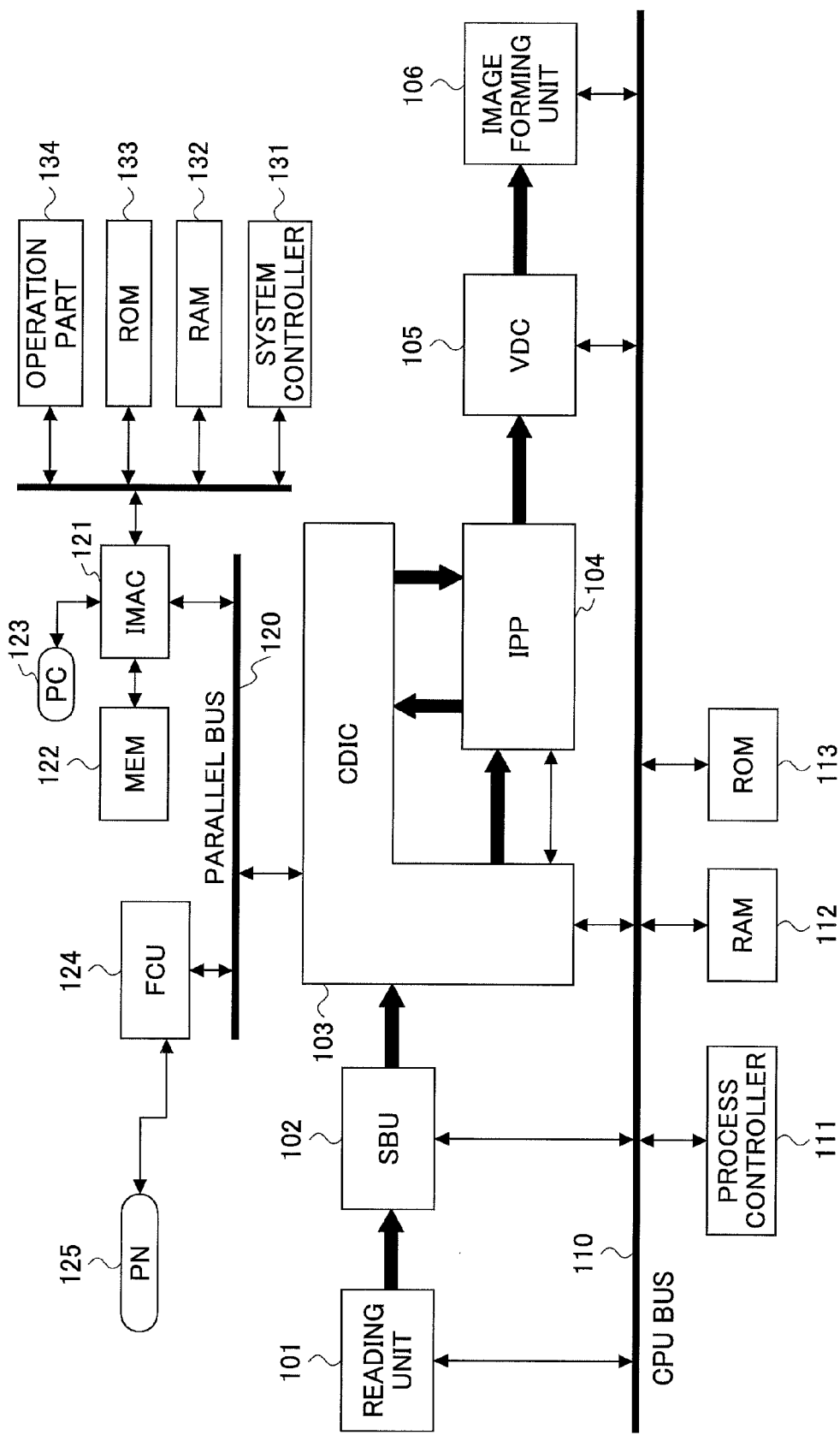
FIG. 17 shows a block diagram of a configuration of an image forming apparatus in a related art.

The image forming apparatus in the embodiment 1 includes an IMC (image controller) 12, a second MEM 11, a MCH (memory control hub) 1003, an ICH (I/O control hub) 1004 and a CPU 1001, instead of the above-mentioned IMAC 121, system controller 131, RAM 132 and ROM 133 shown in FIG. 17. The IMC 12 is connected to a parallel bus 120. The second MEM 11 and the MCH 1003 are connected to the IMC 12. The CPU 1001, a MEM (hereafter referred to as a first MEM) 122, and the ICH 1004 are connected to the MCH 1003. An external PC 123 and an operation part 134 are connected to the ICH 1004 via a bus. Respective ones of the other parts/components are configured the same as those of the configuration shown in FIG. 17 described above, and duplicate description may be omitted.

The reading unit 101 includes lamps, mirrors, lenses and photosensitive devices (i.e., CCD). When an original (i.e., an original image) is read, light is emitted by the lamps to the original, reflected light from the original is focused to the CCD by means of the mirrors and the lenses. The CCD converts the focused light into an electrical signal. The CCD is mounted in the SBU 102. The light thus converted into the electrical signal by means of the CCD is converted into a digital signal in the SBU 102. After that, image data of the digital signal is input to the ODIC 103. The image data is then transferred from the ODIC 103 to the IPP 104. In the IPP 104, signal degradation possibly occurring in an optical signal (i.e., the light finally received by the CCD as mentioned above) and signal degradation possibly occurring in a scanner system are corrected. Then, the image data is returned to the ODIC 103. Then, the image data is transferred to the IMC 121 via the parallel bus 120. In the IMC 121, the thus-transferred image data is stored in the second MEM 11.

The CPU 1001 controls the entire system of the image forming apparatus. When the image forming apparatus is used as a printer, the CPU 1001 extends image data, described in a printer language, in a bit-mapped form. The MCH 1003 acts as a peripheral device of the CPU 1001, and controls data transfer between the CPU 1001, the first MEM 122, the ICH 1004 and the IMC 12. The ICH 1004 also acts as a peripheral device of the CPU 1001, carries out control for the MCH 1003, and also, control of data transfer with a USB and/or a LAN (not shown) connected to an I/F of a serial bus of the ICH 1004. The first MEM 122 acts as a main memory which acts as a work memory of the CPU 1001.

When the image forming apparatus carries out a facsimile transmission process, the IPP 104 carries out image processing on read image data. The image data is then transferred to the FCU 124 via the CDIC 103 and the parallel bus 120. The FCU 124 carries out data conversion on the image data for being transmitted via the communication line/network PN 125. The thus-obtained facsimile data is then transmitted to the PN 125.

When the image forming apparatus caries out a facsimile reception process, data obtained from the PN 125 is converted into image data by means of the FCU 124. The thus-obtained image data is transferred to the IPP 104 via the parallel bus 120 and the CDIC 103. In this case, no special image quality process is carried out. The VDC 105 carries out dot re-arrangement and pulse control on the image data. Then, the image forming unit 106 forms a printed image on a printing paper sheet from the image data.

When the image forming apparatus carries out a plurality of jobs, for example, a copying process, a facsimile transmission/reception process and a printing process in parallel, the CPU 1001 and the process controller 111 carry out control of allocation of rights to use various resources, i.e., the reading unit 101, the image forming unit 106 and the parallel bus 120, to the jobs.

The process controller 111 controls a flow of image data. The CPU 1001 controls the entire system of the image forming apparatus, and manages starting up of the respective resources. The CPU 1001 and the process controller 111 mutually communicate with one another via the parallel bus 120, the CDIC 103 and the CPU bus 110. The CDIC 103 carries out data format conversion for a data interface between the parallel bus 120 and the CPU bus 110.

A user may select one of a plurality of functions of the image forming apparatus which acts as the MFP, by operating the operation part 134. The plurality of functions include a copying function to carry out a copying process, a printer function to carry out a printing process, a scanner function to carry out a scanning function and a facsimile transmission/reception function to carry out a facsimile transmission process and a facsimile reception process.

Figure 2:
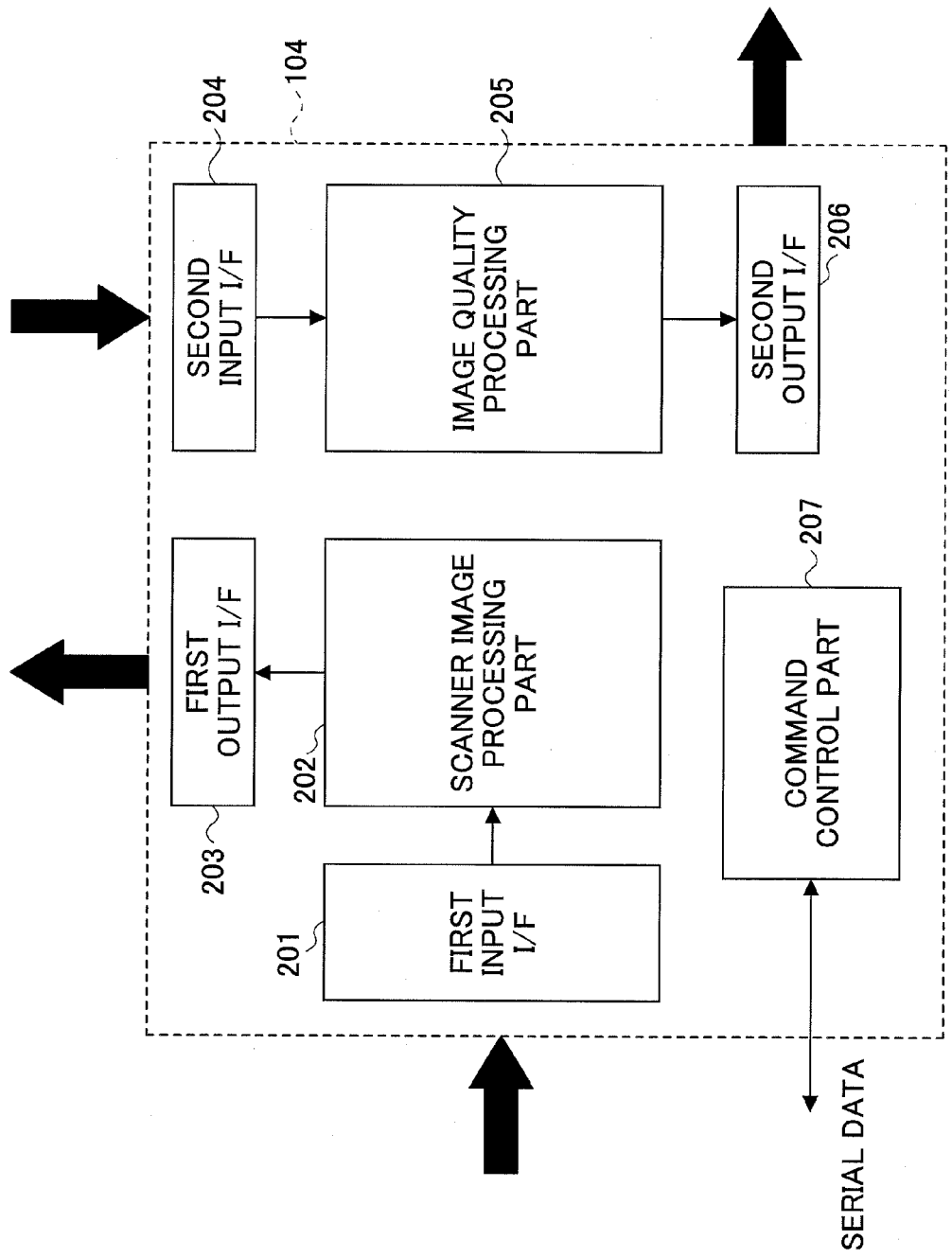
FIG. 2 shows a block diagram of a configuration of an image processing processor (IPP) of FIG. 1.

FIG. 2 shows a block diagram showing a configuration of the IPP 104 shown in FIG. 1. As shown, the IPP 104 includes a first input I/F 201, a scanner image processing part 202, a first output I/F 203, a second input I/F 204, an image quality processing part 205, a second output I/F 206 and a command control part 207.

Image data read by means of the reading part 101 is transmitted to the first input I/F 201 through the SBU 102 and the CDIC 103, and then to the scanner image processing part 202. The scanner image processing part 202 carries out shading correction, scanner γ correction, MTR correction and so forth, for the purpose of correcting degradation of the read image data. After the correction of degradation of the read image data, the image data is transferred to the CDIC 102 via the first output I/F 203.

For the purpose of printing out an image on a printing paper sheet, the image data undergoes an area ratio gray scale process in the image quality processing part 205 after being received by the second input I/F 204 from the CDIC 103. After the image quality process is thus carried out, the image data is output to the VDC 105 via the second output I/F 206.

The area ratio gray scale process may include a density conversion process, a dither process, an error diffusion process or such, and is a process to mainly carry out ratio approximation from area information. By storing the image data once having undergone the scanner image process in the first MEM 122, it is possible to obtain various types of printed images by changing an image processing type to actually apply. For example, if a density of a printed image is changed, the number of lines in a dither matrix is changed, and thus, it is possible to change an appearance of a resulting printed image. In this case, it is not necessary to read the original with the reading unit 101 each time a processing type is thus changed. It is possible to carry out different types of processing several times by reading image data from the first MEM 122 each time. Further, when a scanner in a form of a lone device is used, a scanner image process and a gray scale process are carried out at the same time, and then, resulting image data is output to the CDIC 103. The specific contents of the above-mentioned processes may be programmably changed. The command control part 207 manages switching of the specific contents of the processes, changes in a procedure of each process, and so forth.

Figure 3:
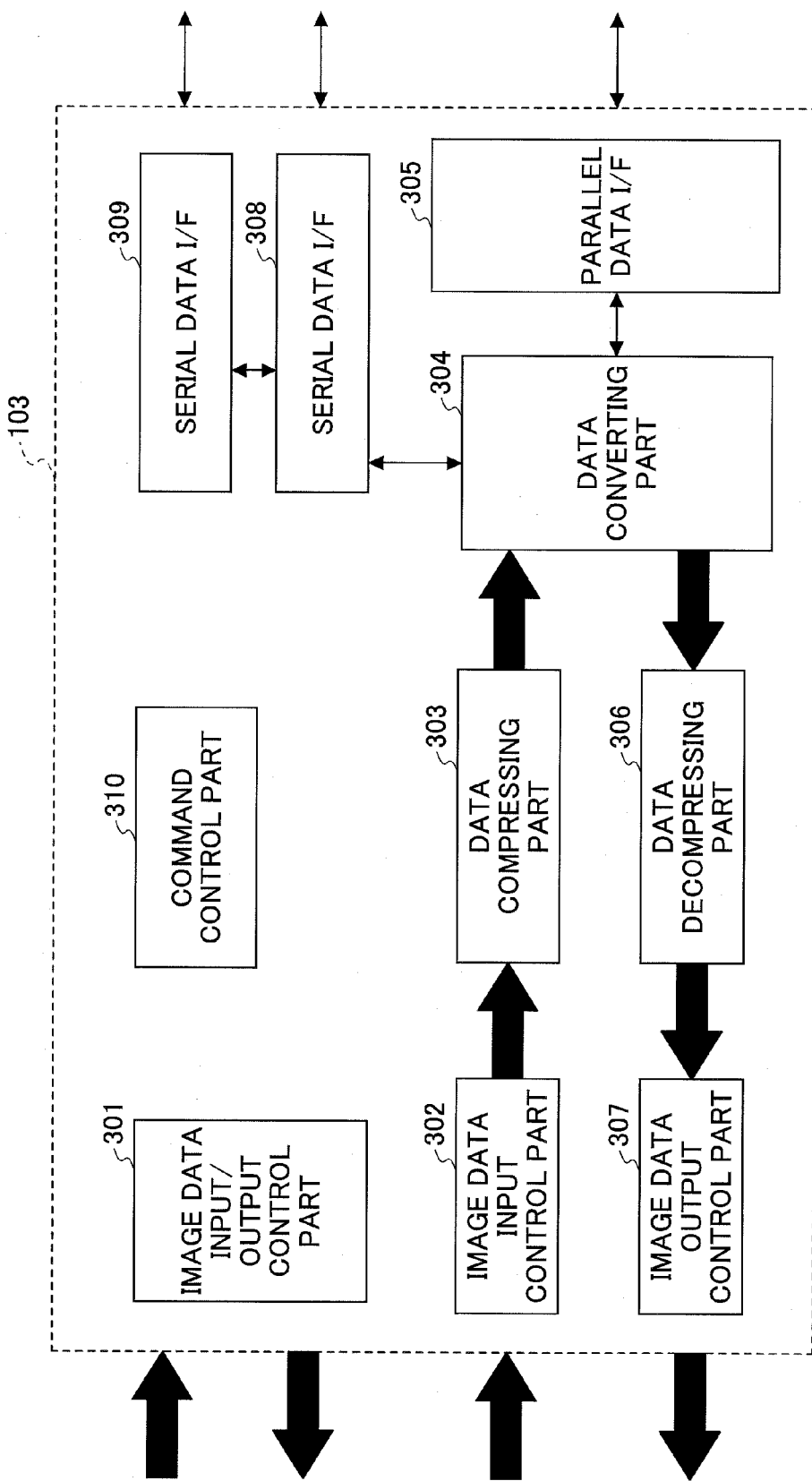
FIG. 3 shows a block diagram of a configuration of a compression/decompression and data interface control part (CDIC) of FIG. 1.

FIG. 3 shows a block diagram of a configuration of the CDIC 103. As shown, the CDIC 103 includes an image data input/output control part 301, an image data input control part 302, a data compressing part 303, a data converting part 304, a parallel data I/F 305, a data decompressing part 306, an image data output control part 307, a first serial data I/F 308, a second serial data I/F 309 and a command control part 310.

The image data input/output control part 301 inputs image data from the SBU 102, and outputs the image data to the IPP 104. The image data input control part 302 inputs image data having undergone the scanner image correction process carried out by the IPP 104. The input data undergoes a data compression process in the data compressing part 303 for the purpose of improving the data transfer efficiency in the parallel bus 126. Then, the thus-processed image data is output to the parallel bus 120 via the parallel data I/F 305.

The image data input to the parallel bus 120 via the parallel data I/F 305 has been compressed for the purpose of the bus transfer. Therefore, the image data is decompressed in the data decompressing part 306. The thus-decompressed image data is transferred to the IPP 104 by the image data output control part 307.

The data converting part 304 has a function of converting between parallel data and serial data. The CPU 1001 transfers data to the parallel bus 120 and the process controller 111 transfers data to the CPU bus 110. The data converting part 304 carries out data conversion for the purpose of communication between the CPU 101 and the system controller 111. The second serial data I/F 309 provides an interface for the IPP 104.

Figure 4:
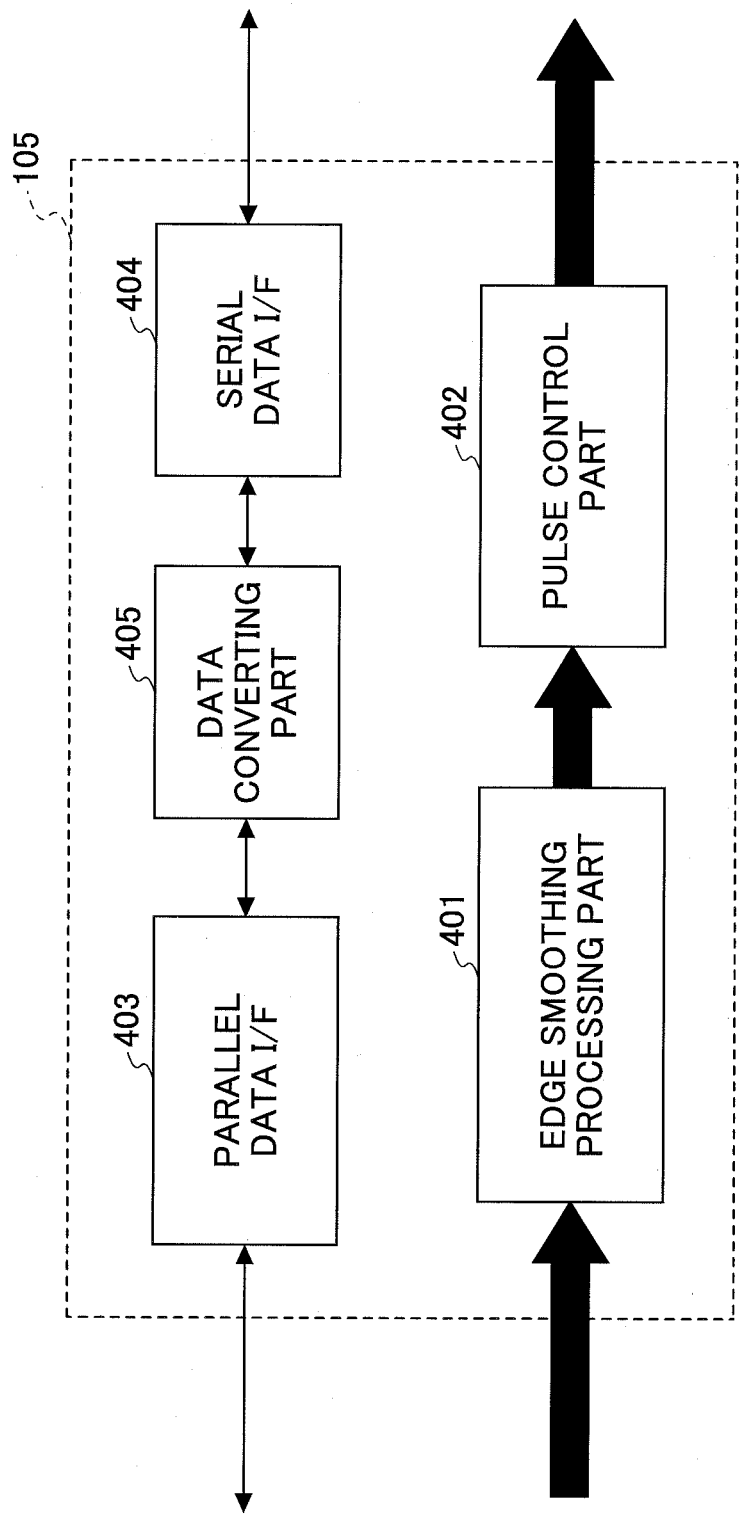
FIG. 4 shows a block diagram of a configuration of a video data control part (VDC) of FIG. 1.

FIG. 4 shows a configuration of the VDC 105. As shown, the VDC 105 includes an edge smoothing processing part 401, a pulse control part 402, a parallel data I/F 403, a serial data I/F 404 and a data converting part 405.

The VDC 105 carries out an additional process to the image data according to characteristics of the image forming unit 106. That is, the edge smoothing processing part 401 carries out an edge smoothing process to carry out re-arrangement of dots. The pulse control part 402 carries out pulse control of the image data for dot formation. Then, the image data thus processed is output to the image forming unit 106. The VDC 105 also has a format converting function between parallel data and serial data in addition to the image data converting function. The VDC 105 has such a configuration as to alone be able to carry out communication between the CPU 1001 and the process controller 111. That is, format conversion is carried out between parallel data and serial data by means of the data converting part 405 which converts between data received from the parallel data I/F 403 which carries out transmission/reception of parallel data and the serial data I/F 404 which carries out transmission/reception of serial data.

Figure 5:
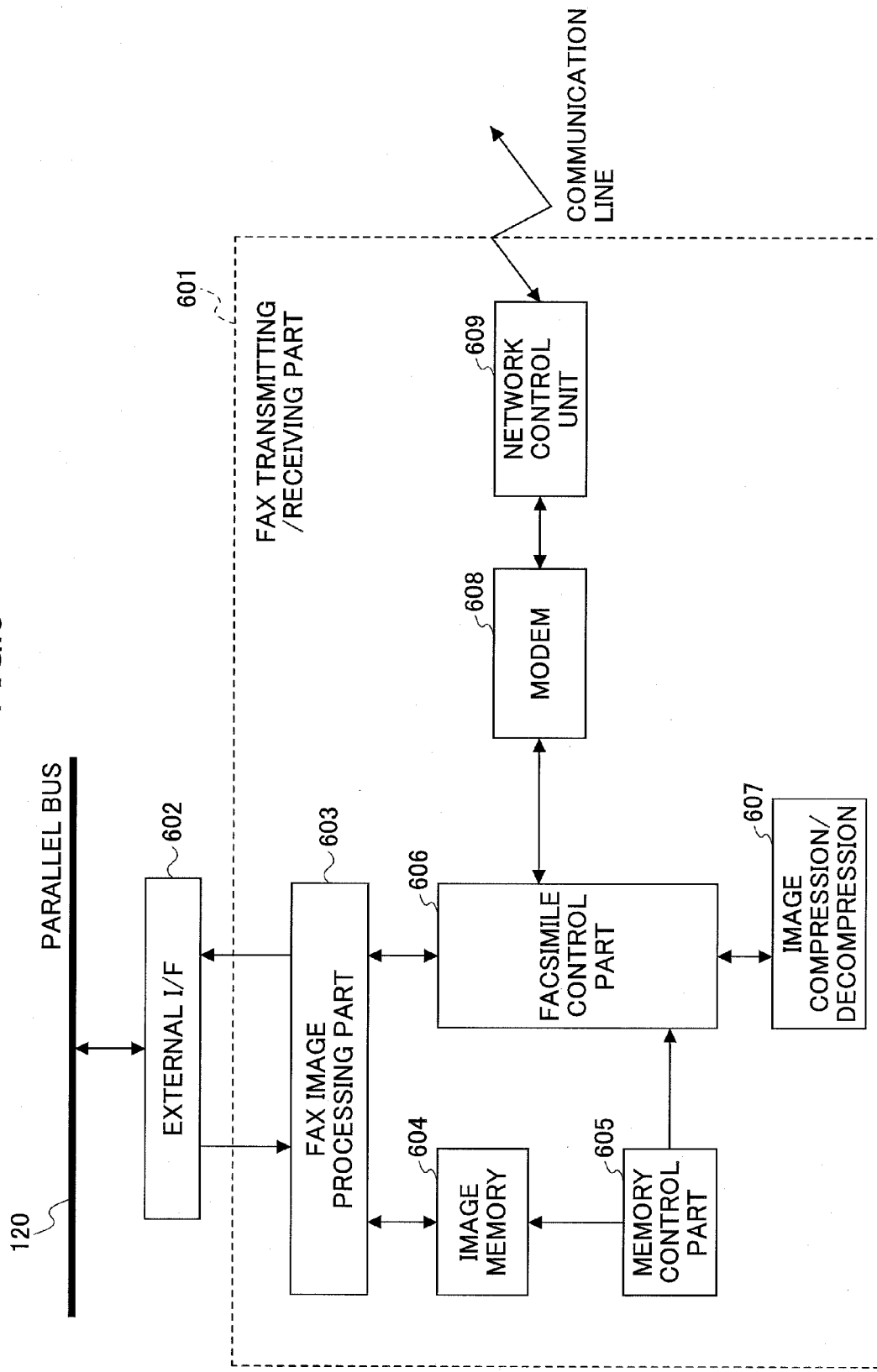
FIG. 5 shows a block diagram of a configuration of a facsimile control unit (FCU) of FIG. 1.

FIG. 5 shows a block diagram of a configuration of the FCU 124. The FCU 124 converts the image data in a communication form, and then transmits the image data to the external line (communication line) PN 125. Further, the FCU 124 returns data received externally into image data, for printing out by means of the image forming unit 106 via an external I/F 602 and the parallel bus 120. As shown in FIG. 5, the FCU 124 includes a facsimile transmission/reception part 601 and the external I/F 602. The facsimile transmission/reception part 601 includes a facsimile image processing part 603, an image memory 604, a memory control part 605, a facsimile control part 606, an image compressing/decompressing part 607, a modem 608 and a network control unit 609. It is noted that, concerning the facsimile image processing part 603, a binary smoothing process is actually carried out by an edge smoothing processing part (not shown) of a video control part 505 which will be mentioned later. Further, concerning the image memory 604, an output buffer function is actually carried out by the first MEM 122 and partially by the second MEM 11.

Figure 6:
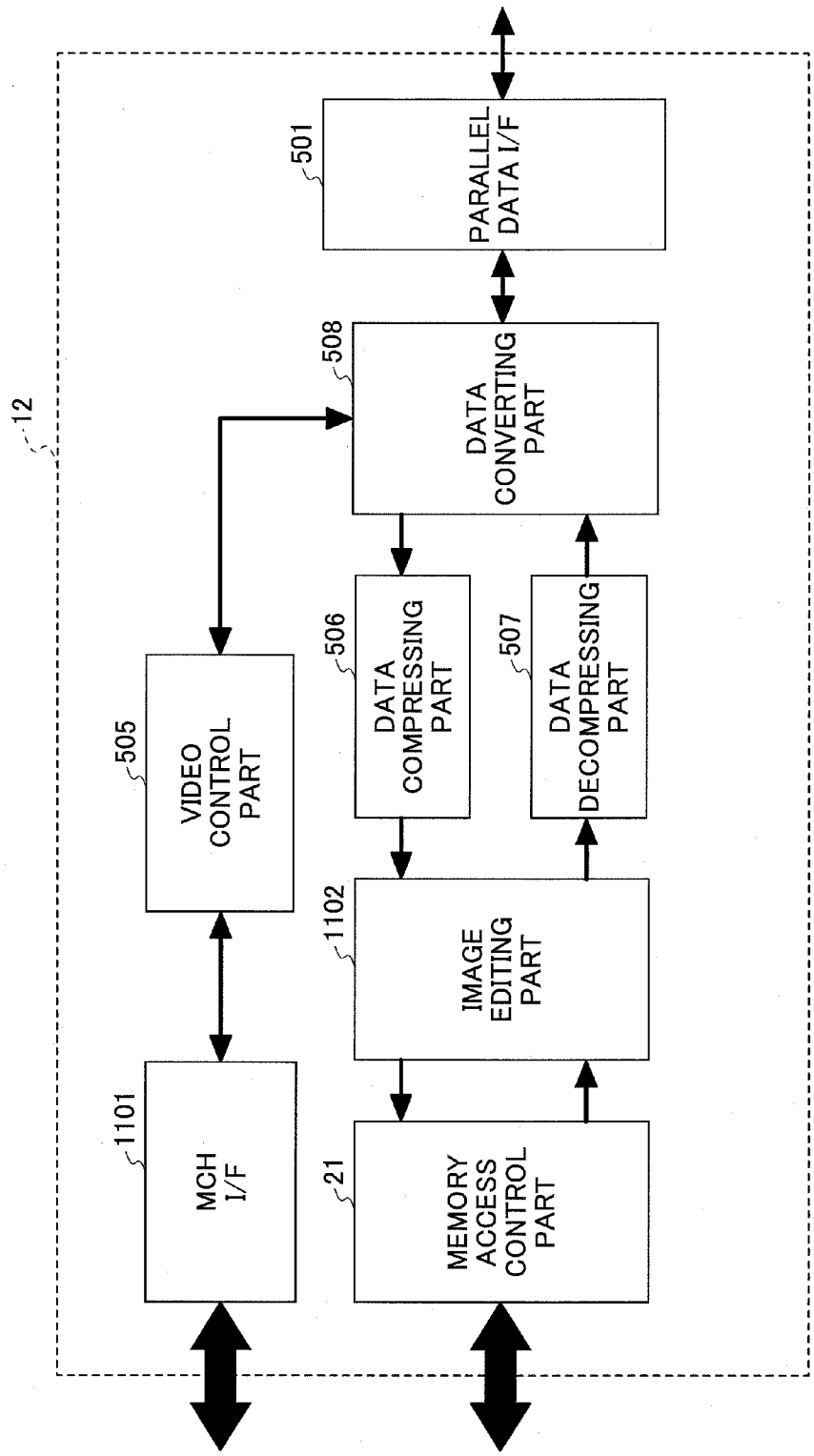
FIG. 6 shows a block diagram of a configuration of an IMC of FIG. 1.

FIG. 6 shows a block diagram of the IMC 12 of FIG. 1. As shown, the IMC 12 includes a memory access control part 21, a parallel data I/F 501, the video control part 505, a data compressing part 506, a data decompressing part 507, a data converting part 508, an MCH I/F 1101 and an image editing part 1102. The memory access control part 21 carries out an I/F function for the second MEM 11. Thereby, the image data input to the IMC 12 is once stored in the second MEM 11 acting as a buffer memory, and then, the image data is read therefrom at required timing.

The IMC 12 manages an interface for the parallel bus 120 for the image data. The IMC 12 controls storing/reading of the image data to/from the second MEM 11. Mainly the IMC 12 controls extension of code data input from the PC 123 into image data.

Thus-obtained extended image data, or image data which has been input from the parallel bus 120 via the parallel data I/F 501, is once stored in the second MEM 11. After that, the image data is stored in the first MEM 112 via the MCH 1003. In this case, the data converting part 507 selects the image data to be thus stored, the data compressing part 506 secondarily compresses the image data for the purpose of improving the memory usage efficiency, and the memory access control part 21 stores the image data in the first MEM 122 while managing addresses of the first MEM 122.

When the image data thus stored in the first. MEM 122 is read, the memory access control part 21 controls addresses to read, and the data decompressing part 507 decompresses the thus-read image data. The thus-decompressed image data is then transferred to the parallel bus 120 via the parallel data I/F 501.

Figure 7:
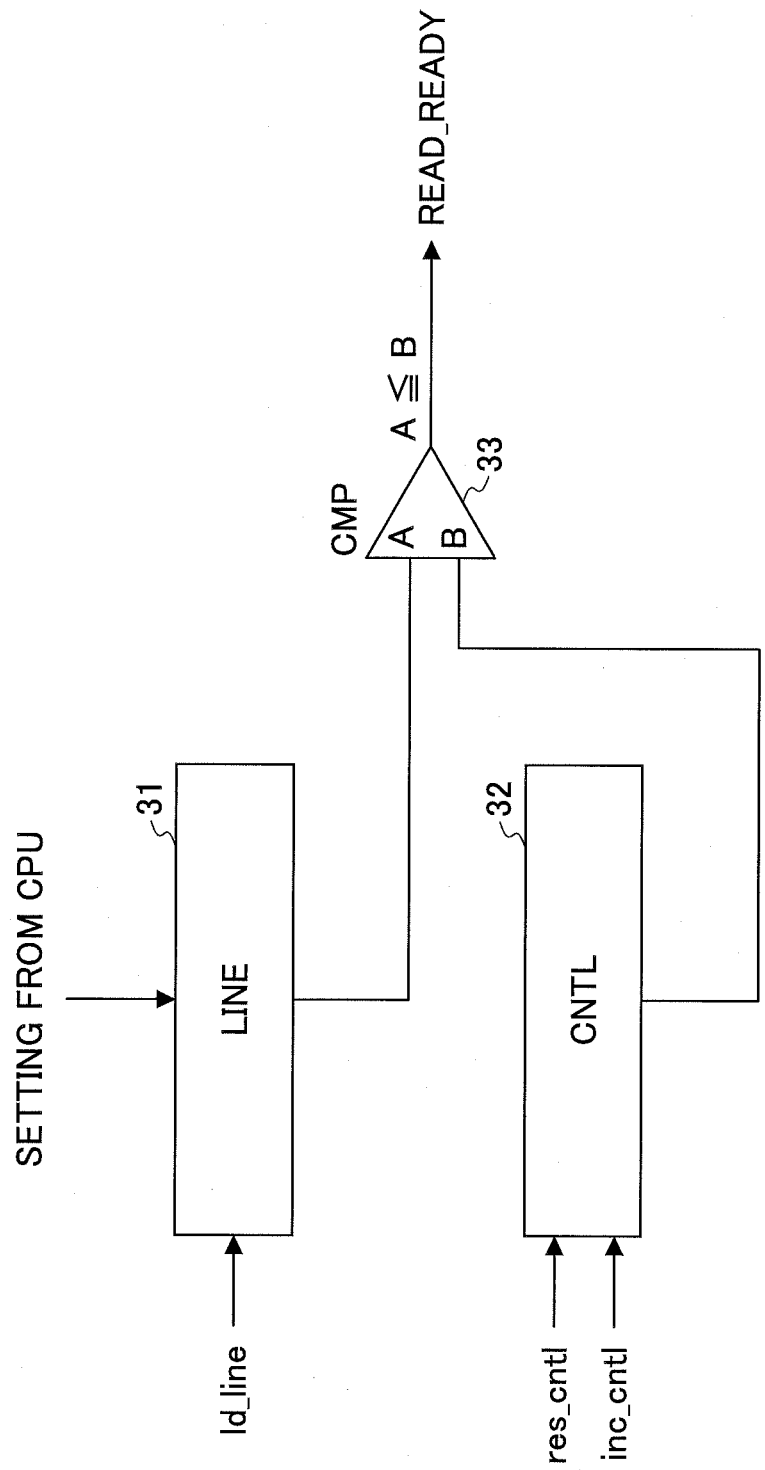
FIG. 7 shows a block diagram of a circuit for controlling reading timing from a second MEM of FIG. 1.

FIG. 7 shows a block diagram of a circuit for controlling timing to read the image data from the second MEM 11. This circuit is included in the memory access control part 21 of the IMC 12 shown in FIG. 6. The circuit includes, as shown, a line register (referred to as LINE hereafter) 31, a line counter (referred to as CNTL hereafter) 32 and a comparator 33.

To the LINE 31, the CPU 1001 previously sets the number of lines at which reading from the second MEM 11 is started. The number of lines at which reading from the second MEM 11 is started will be described later. Reading from the second MEM 11 is started as a result of a register load signal ld_line is activated. The CNTL 32 counts the number of lines stored in the second MEM 11. A count value of the CNTL 32 is reset by a reset signal res_cnt1. Each time that line data of image data is stored in the second MEM 11, a counter increment signal inc_cnt1 is activated, and thereby, the count value is increased. The value of the LINE 32 and the count value of the CNTL 32 are compared by the comparator 33. When the count value of the CNTL 32 reaches the value of the LINE 31, a READ_READY signal indicating timing to read from the second MEM 11 is activated.

There may be two cases. A first case is where, when the READ_READY signal is activated, reading from the second MEM 11 is automatically started. A second case is where, when the READ_READY signal is activated, an interrupt signal is generated to the CPU 1001 which actually controls reading from the second MEM 11.

Figure 8:
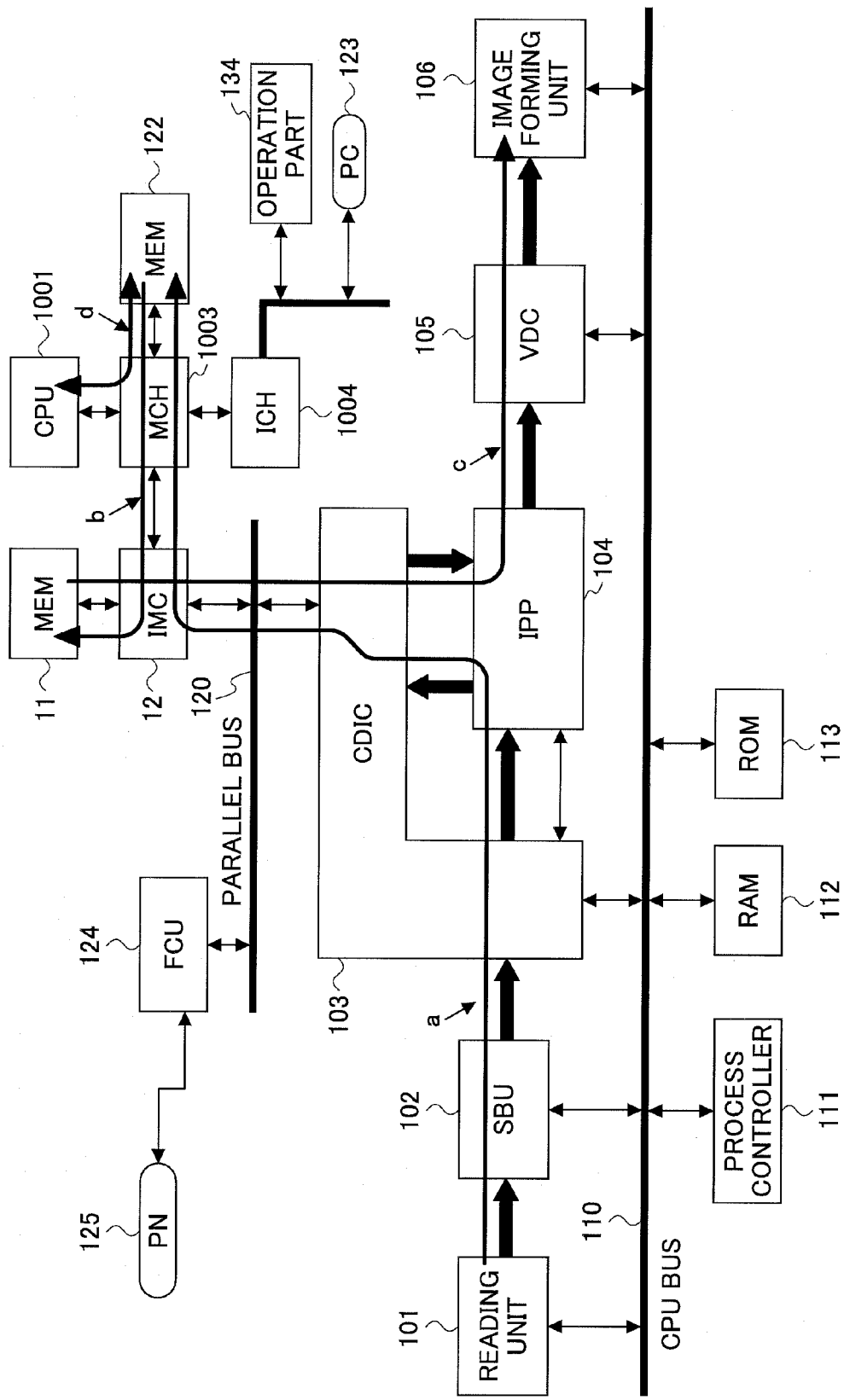
FIG. 8 shows a flow of data when a copying process is carried out in a configuration shown in FIG. 1.

FIG. 8 shows a flow of data when a copying process is carried by the system configuration shown in FIG. 1. Original image data (referred to as plot data hereafter) obtained from the reading unit 101 is transferred through, as indicated by a path 'a' of the plot data, the SBU 102, the CDIC 103, the IPP 104, the CDIC 103, the parallel bus 120, the IMC 12 and the MCH 1003, to the first MEM 122. After that, as indicated by a path 'b' of the plot data, the plot data is transferred through the MCH 1003 and the IMC 12, to the second MEM 11. After that, as indicated by a path of the plot data 'c', the plot data is read from the second MEM 11, is transferred through the IMC 12, the parallel bus 120, the CDIC 103, the IPP 104 and the VDC 105, to the image forming unit 106. Consequently, a printed image is obtained on a printing paper sheet from the image forming unit 106. A path 'd' of the plot data shows data transfer for when the CPU 1001 carries out another process at the same time. The above-mentioned other process is, for example, a bitmap extension process in a printing process with the use of the first MEM 122 as a work memory. The above-mentioned path 'd' of data transfer for the other process may cause a predetermined delay in the above-mentioned data transfer for consequently obtaining the printed image from the plot data, because a data path to/from the first MEM 122 is used both as the above-mentioned path 'b' as well as the above-mentioned path 'd'. Therefore, reading the plot data from the second MEM 11 in the data transfer of the path 'c' to the side of the image forming unit 106 should be started after a stored data amount of the plot data in the second MEM 12 reaches such a data amount that, even when the above-mentioned predetermined delay occurs in the above-mentioned path 'b' from the first MEM 122 to the second MEM 11, the plot data can be continuously (i.e., without any interruption or delay) transferred in the path 'c' to the side of the writing engine (i.e., the image forming unit 106) from the second MEM 11 at the predetermined data transfer rate.

It is noted that the plot data should be continuously transferred from the second MEM 11 to the side of the image forming unit 106 in the path 'c' at the predetermined data transfer rate until a predetermined data amount of the plot data (for example, for an A4-size image on a printing paper sheet as will be described later) is finally transferred to the side of the image forming unit 106 in the path 'c'. For this purpose, the stored data amount in the second MEM 11 at which reading from the second MEM 11 is started should be so sufficient that, even when a data amount per unit time transferred to the second MEM 11 from the first MEM 122 is reduced due to the above-mentioned predetermined delay in the path 'b', thereby the stored data amount in the second MEM 11 gradually reduces, while the plot data is transferred from the second MEM 11 to the side of the image forming unit 106 in the path 'c' at the predetermined data transfer rate, the stored data amount in the second MEM 11 is prevented from becoming zero, before the above-mentioned predetermined amount of the plot data has been completely transferred to the side of the image forming unit 106.

For the purpose of illustrating an advantageous function of the embodiment 1, such a configuration (for a comparative example) may be assumed that the second MEM 11 were omitted and thus, the plot data transferred to the IMC 12 were stored in the first MEM 122, and then, the plot data were directly transferred to the side of the image forming unit 106.

Such a configuration for a comparative example will be described later with reference to FIGS. 18 through 21. In this configuration, access carried out from the CPU 1001 to the first MEM 12 is carried out so frequently for bitmap extension that data transfer to the side of the images forming unit 106 would be adversely affected, whereby a defective printed image may be consequently obtained, as will be described later with reference to FIGS. 10A through 10C. Therefore, this configuration of omitting the second MEM 11 for a comparative example may be problematic.

For a printing process carried out from the PC 123, FIG. 9A shows a case where line data can be transferred within a writing LSYNC period, in the above-mentioned configuration omitting the second MEM 11 for a comparative example. FIG. 9B shows a case where the line data cannot be transferred within the writing LSYNC period due to the above-mentioned interruption of data transfer or such.

In FIGS. 9A, 9B, PLOT_START means a direction to start printing. When this data changes from "0" to "1", printing is started. D_1, D_2, . . . , of CPU ⇔ MEM show data transfer between the CPU 1001 and the first MEM 122. Writing LSYNC means a synchronization signal for writing as mentioned above. When this signal changes from "0" to "1", reading of line data of the plot data from the first MEM 122 is started, which is then transferred to the VDC 105 and then, to the image forming unit 106. LINE_1, LINE_2, . . . of MEM→PLOT show line data of the plot data transferred to the VDC 105 and to the image forming unit 106 from the first MEM 122.

It is noted that, each line data of the plot data should be transferred completely within the writing LSYNC period. If each line data cannot be transferred within the writing LSYNC period, a defect may occur in a printed image consequently obtained on a printing paper sheet, as will be described with reference to FIGS. 10A through 10C.

In FIG. 9A, access is carried out from the CPU 1001 to the first MEM 122. However, each line data can be completely transferred within the writing LSYNC period. Therefore, no defect occurs in a printed image obtained on a printing paper sheet.

In FIG. 9B, access is carried out from the CPU 1001 to the first MEM 122 so frequently that each line data cannot be completely transferred within the writing LSYNC period. In this case, as shown in FIG. 9B, data transfer of D_6, D_7 and D_8 between the CPU 1001 and the first MEM 122 adversely affects data transfer from the first MEM 122 to the MCH 1003 and to the IMC 12 to cause a delay or interruption in the data transfer. As a result, each line data cannot be completely transferred within the writing LSYNC period. Thereby, a defect occurs in a printed image obtained on a printing paper sheet.

An example of transfer rate of image data transferred from the first MEM 122 to the MCH 1003 and the IMC 1002 (i.e., the above-mentioned predetermined data transfer rate) is shown below:

For example, it is assumed that, in a printer of 50 ppm, a writing resolution is 600 dpi, a line velocity is 250 mm/s, and a '1 pixel-1 bit' image system is applied. In this case, ppm means print per minute. 50 ppm means printing of 50 sheets is carried out per one minute. The line velocity means a velocity of a printing paper sheet in a paper feeding direction in the image forming unit 106.

In this case, a value of the above-mentioned writing LSYNC period is calculated as follows:

$$\text{Writing } LSYNC \text{ period } [\mu s] = \frac{25.4 \times 1000000}{(dpi \times \text{line velocity } [mm/s])}$$

$$= \frac{25.4 \times 1000000}{(600 \times 250)}$$

$$= 169.3 \ [\mu s]$$

On one hand, a data amount for a line of the plot data is calculated as follows for a longitudinal direction of A4 size paper:

$$\text{The number of pixels} = \frac{\text{size } [mm] \times dpi}{25.4}$$

$$= \frac{297 \times 600}{25.4}$$

$$= 7016 \ [\text{pixels}]$$

Further, for full-color printing, where the number of images to produce is total 4 planes (i.e., Y, M, C and K), and 1 byte=8 bits, a data amount is calculated as follows:

One line data amount=7016 [pixels]×1 [bit]×4 [planes]/8 [bits]=3508 [bytes]

That is, in order to prevent a defect from occurring in a printed image on a printing paper sheet, each 3508 bytes (data amount of line data) should be transferred within 169.3 μs (writing LSYNC period). In this case, the above-mentioned predetermined data transfer rate can be expressed as follows:

Predetermined data transfer rate=3508 [bytes]/169.3 [μs]=20.7 [MB/s]

Further, assuming a high speed printer with high resolution writing, for example, assuming a printer of 100 ppm with a writing resolution of 1200 dpi, line velocity of 500 mm/s and a '1 pixel-2 bit' system, $$\text{Writing } LSYNC \text{ period } [\mu s] = \frac{25.4 \times 1000000}{(dpi \times \text{line velocity } [mm/s])}$$

$$= \frac{25.4 \times 1000000}{(1200 \times 500)}$$

$$= 42.3 \ [\mu s]$$

On one hand, a data amount for a line of plot data is calculated as follows for a longitudinal direction of A4 size paper:

$$\text{The number of pixels} = \frac{\text{size } [mm] \times dpi}{25.4}$$

$$= \frac{297 \times 1200}{25.4}$$

$$= 14032 \ [\text{pixels}]$$

Further, for full-color printing, where the number of images to produce is total 4 planes (i.e., Y, M, C and K), and 1 byte=8 bits, a data amount is calculated as follows:

One line data amount=14032 [pixels]×2 [bit]×4 [planes]/8 [bits]=14032 [bytes]

That is, in order to prevent a defect from occurring in a printed image on a printing paper sheet, 14032 bytes (data amount) should be transferred within 42.3 μs (writing LSYNC period). In this case, the predetermined data transfer rate can be obtained as follows:

Predetermined data transfer rate=14032 [bytes]/42.3 [μs]=331.7 [MB/s]

These calculation results show that, in order to prevent a defect from occurring in a printed image consequently obtained on a printing paper sheet, it is necessary to transfer the plot data from the first MEM 122 to the MCH 1003 and the IMC 12 at a high transfer rate.

However, as mentioned above, transfer of the plot data may be obstructed when the CPU 1001 accesses the first MEM 122 frequently to carry out another process such as a process of bitmap extension or such.

Further, the CPU 1001 has a cache memory for achieving high speed data processing. That is, a program or data is temporarily stored in the cache memory. Then, when the same data exists in the cache memory as that originally stored in the first MEM 122, the CPU 1001 obtains the data from the cache memory instead of obtaining from the first MEM 122. Thus, the CPU 1001 can achieve high speed data processing. In this method of utilizing the cache memory, high speed data processing is achievable when desired data is stored in the cache memory, i.e., a so-called cache hit occurs. However, if desired data does not exist in the cache memory, that is, when a so-called cache miss occurs, the CPU 1001 returns updated data from the cache memory to the first MEM 122, and then, the CPU 1001 loads the corresponding data in the cache memory from the first MEM 122. When such a cache miss occurs, data transfer between the CPU 1001 and the first MEM 122 is carried out frequently. Thereby, transfer of the plot data to the side of the image forming unit 106 may have a delay, and thus, a defect may occur in a printed image finally obtained on a printing paper sheet.

Figure 10A:
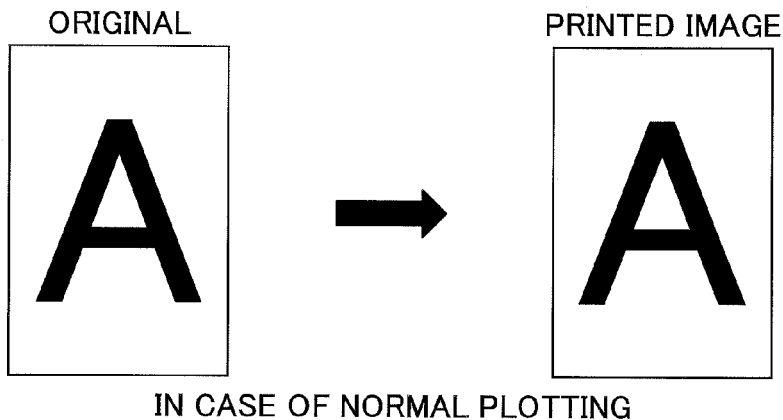
FIGS. 10A, 10B and 10C show states of printed images formed on printing paper sheets in a case of normal plotting, and in cases of defective plotting.
Figure 10B:
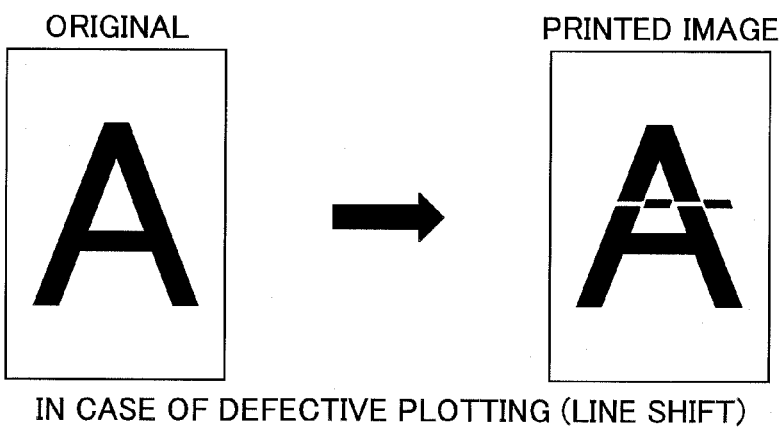
Figure 10C:
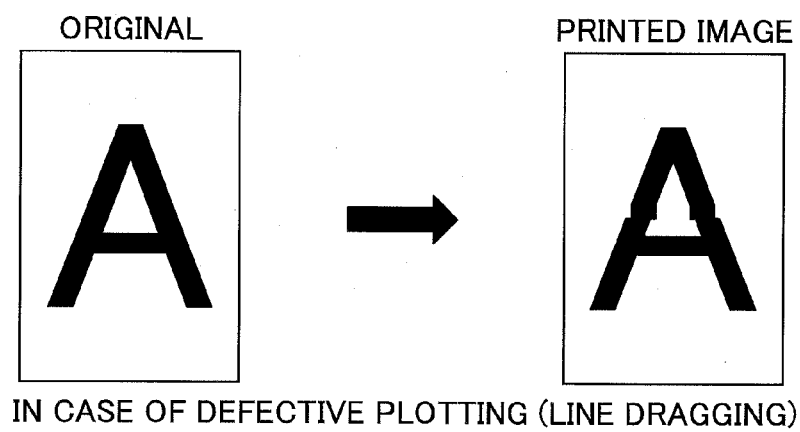

FIGS. 10A through 10C show examples of printed images finally obtained on printing paper sheets. FIG. 10A shows an example in which no defect occurs in a printed image consequently obtained on a printing paper sheet. FIGS. 10B, 10C show examples in which defects occur in printed images consequently obtained on printing paper sheets because data transfer of line data of the plot data to the side of the image forming unit 106 is obstructed by the frequent access to the first MEM 122 by the CPU 1001 because of another process as mentioned above. In FIG. 10A, it can be seen that a printed image (printed image) is the same as an original image. In contrast thereto, in FIG. 10B, a line shift occurs in the printed image. In FIG. 100, line dragging occurs (i.e., image data of a previous line is dragged) in the printed image.

Thus, such a defective printed image might be obtained in the above-mentioned configuration omitting the second MEM 11 in which the plot data transferred to the IMC 12 which were then stored in the first MEM 122, were then directly transferred to the side of the image forming unit 106.

In contrast thereto, according to the embodiment 1, when printing is started, that is, when the plot data is transferred to the side of the image forming unit 106 to consequently obtain a printed image therefrom, the plot data read from the first MEM 122 is transferred to the MCH 1003 and the IMC 12. Then, the plot data is once stored in the second MEM 11 (in the above-mentioned path 'b'). After that, the plot data is read from the second MEM 11, is transferred through the IMC 12, the parallel bus 120, the CDIC 103, the IPP 104 and the VDC 105, to the image forming unit 106. Thus, a printed image is obtained from the image forming unit 106 on a printing paper sheet.

FIG. 11 shows a state of control of reading the plot data from the second MEM 11. That is, when the above-mentioned READ_READY signal indicating timing of reading, provided by the circuit of FIG. 7, is activated, the memory access control part 21 of the IMC 12 automatically reads the plot data from the second MEM 11.

FIG. 12 shows a state where the plot data is read from the second MEM 11. As shown, when the READ_READY signal shown in FIG. 7 is thus activated, an interrupt signal CPU_IRQ for the CPU 1001 is activated. The CPU 1001 detects the signal CPU_IRQ, and then, generates a READ_START signal for starting reading of the plot data from the second MEM 11 to the memory access control part 21 of the IMC 12. Thus, the plot data is read from the second MEM 11.

Figure 22A:
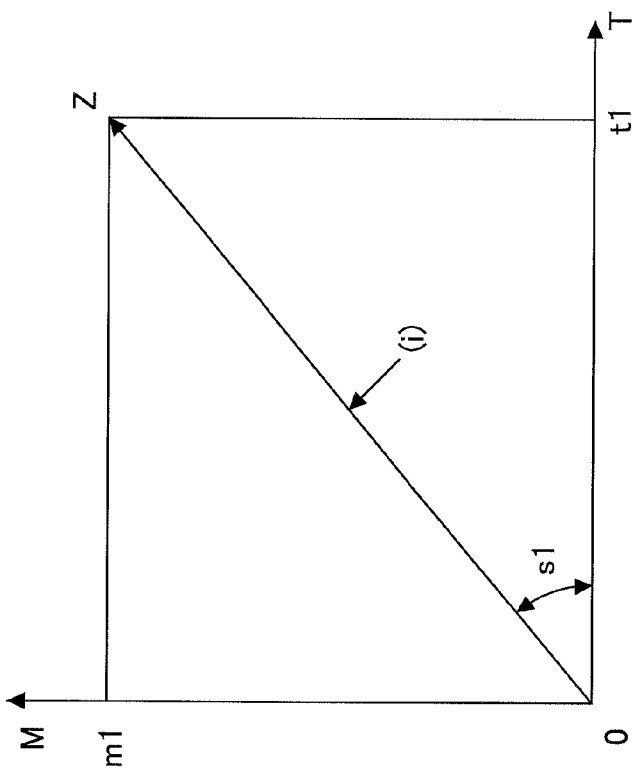
FIGS. 22A and 22B illustrate image data reading timing from the second MEM.

FIG. 22A shows a relationship between the number M of lines and a transfer time T for when the plot data is transferred from the second MEM 11 to the side of the image forming unit 106 in the above-mentioned path 'c' of FIG. 8. Here, the above-mentioned example of 100 ppm is assumed for printing for an A4-size printed image.

An abscissa axis of FIG. 22A represents a time having passed from a start of transfer of the plot data from the second MEM 11 to the side of the image forming unit 106. An ordinate axis represents the number of lines of the plot data thus transferred. A time t1 shows a time at which printing of one A4-size printed image is finished. The number m1 of lines shows the number of lines required for printing for one A4-size printed image. The number of lines required for printing for one A4-size printed image is calculated as follows assuming 1200 dpi:

$$\text{The number of lines} = \frac{\text{size [mm]} \times \text{resolution [dpi]}}{25.4 \text{ [mm]}}$$
$$= \frac{210 \times 1200}{25.4}$$
$$= 9921$$

The above-mentioned time t1 at which printing for one A4-size printed image is calculated as follows in a condition where the writing LSYNC period for transferring one line of the plot data is 42.3 μs as mentioned above:

$$\text{Printing time [ms]} = \frac{\text{writing } LSYNC \text{ period [}\mu s\text{]} \times \text{the number of lines}}{1000}$$
$$= \frac{42.3 \times 9921}{1000}$$
$$= 419.7 \text{ [ms]}$$

Thus, the time t1 of FIG. 22A is 419.7 ms, and the number m1 of lines to transfer is 9921 lines.

As shown in FIG. 22A, a cross point of the above-mentioned t1 and m1 is Z. A straight line (i) connecting the origin and the point Z represents the number of lines transferred per unit of time. A slope s1 of the straight line shows the predetermined data transfer rate. The predetermined data transfer rate is 331.7 MB/s calculated as above.

Next, the value set in the above-mentioned LINE 31 shown in FIG. 7 is obtained. That is, as mentioned above, even when data transfer between the MEM 122 and the MCH 1003 of FIG. 8 is in congestion (i.e., the above-mentioned predetermined delay occurs), and thus, a transfer rate from the first MEM 122 to the second MEM 11 in the above-mentioned path 'b' reduces, no defect should occur in a printed image consequently obtained on a printing paper sheet. For this purpose, before starting transfer of the plot data from the second MEM 11 to the side of the image forming unit 106, the number of lines of the plot data should be stored in the second MEM 11. This number of lines is set in the LINE 31. This number of lines is determined by the following condition. That is, even when the predetermined delay occurs in data transfer from the first MEM 122 to the second MEM 11 in the path 'b' as mentioned above, data transfer in the path 'c' from the second MEM 11 to the side of the image forming unit 106 (i.e., writing engine) at the predetermined data transfer rate continuously to finish printing for one A4-size printed image.

The above-mentioned predetermined data transfer rate is 331.7 MB/s for example. For the purpose of illustrating a function of the embodiment 1, it is assumed that the above-mentioned predetermined delay reduces a transfer rate from the first MEM 122 to the second MEM 11 of the path 'b' into a transfer rate of 300 MB/s. The predetermined delay occurs because data transfer from the first MEM 122 to the second MEM 11 of the path 'b' and data transfer between the CPU 1001 and the first MEM 122 of the path 'd' occur at the same time, and thus, data transfer between the first MEM 122 and the MCH 1003 is in congestion that obstructs the data transfer there.

Figure 22B:
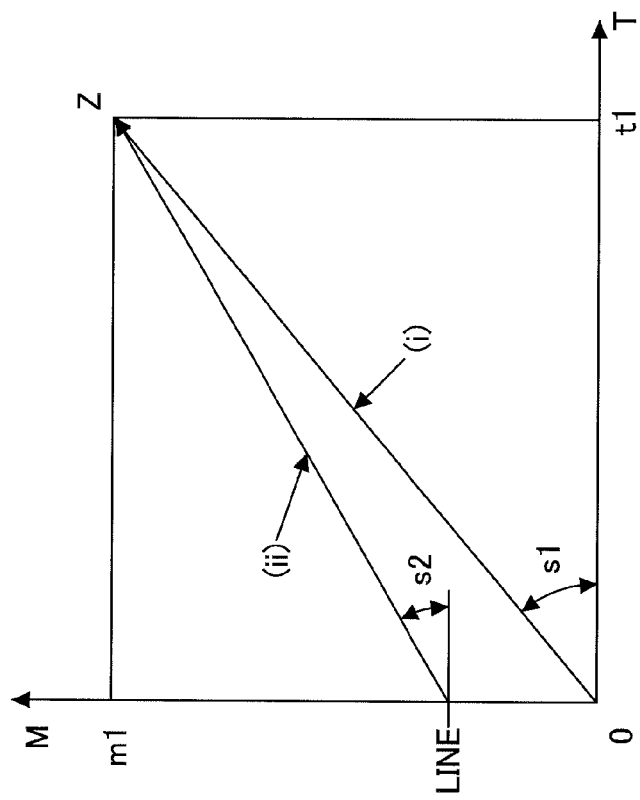

FIG. 22B shows this state. In FIG. 22B, a straight line (ii) shows the above-mentioned reduced data transfer rate of 300 MB/s. That is, a slope s2 of the straight line represents the data transfer rate of 300 MB/s. The above-mentioned number of lines to be set in the LINE 31 is obtained as a cross point between the straight line (ii) and the ordinate axis. This cross point is indicated as LINE in FIG. 22B.

The thus-obtained value is then set in the above-mentioned LINE 31 of FIG. 7. Thereby, it is possible to avoid such a situation that data transfer to the side of the image forming unit 106 is interrupted or delayed, which may consequently result in a defective printed image.

The value to be set in the LINE 31 is calculated as follows:

$$LINE = \frac{(\text{slope of line } (i) - \text{slope of line } (ii)) \times (A4 \text{ printing time})}{(\text{data amount of one line}[MB])}$$
$$= \frac{(s1 \text{ [}MB\text{]} - s2 \text{ [}MB\text{]}) \times t1 \text{ [s]}}{(\text{data amount of one line } [MB])}$$
$$= \frac{(331.7 - 300) \times (419.7/1000)}{\{14032/(1024 \times 1024) \text{ [bytes]}\}}$$
$$= 994.2$$

It is noted that, as well-known in the technical field of calculating a memory capacity for example, 1 [kB]=1024 [bytes], 1 [MB]=1024 [kB], and thus, 1 [MB]=1024×1024 [bytes]

Accordingly, in this case, an integer value 995 larger than the above-calculated value 994.2 is set in the LINE 31.

For another example, it is assumed to print an image of A3 size.

The number of lines for an image of A3 size is calculated as follows:

$$\text{The number of lines} = \frac{\text{size [mm]} \times \text{resolution [dpi]}}{25.4 \text{ [mm]}}$$
$$= \frac{420 \times 1200}{25.4}$$
$$= 19843$$

A printing time t1 for an image of A3 size is calculated as follows in a condition in which a required transfer time for one line (i.e., writing LSYNC period) is 42.3 μs:

$$A3 \text{ printing time} = \frac{\text{writing } LSYNC \text{ period [}\mu s\text{]} \times \text{the number of lines}}{1000}$$
$$= \frac{42.3 \times 19843}{1000}$$
$$= 839.4 \text{ [ms]}$$

In this case, a value to be set in the LINE 31 is calculated as follows:

$$LINE = \frac{(\text{slope of line } (i) - \text{slope of line } (ii)) \times (A3 \text{ printing time})}{(\text{data amount of one line[}MB\text{]})}$$
$$= \frac{(s1 \text{ [}MB\text{]} - s2 \text{ [}MB\text{]}) \times t1 \text{ [s]}}{(\text{data amount of one line [}MB\text{]})}$$
$$= \frac{(331.7 - 300) \times (839.4/1000)}{\{14032/(1024 \times 1024) \text{ [bytes]}\}}$$
$$= 1988.4$$

Accordingly, in this case, an integer value 1989 larger than the above-calculated value 1988.4 is set in the LINE 31.

Thus, the value to set in the LINE 31 is obtained for each particular size of a printed image. Thereby, it is possible to minimize a required time to previously store the plot data in the second MEM 11 (i.e., the number of lines to set in the LINE 31), and thus, it is possible to minimize a total time required for obtaining a printed image.

Figure 23:
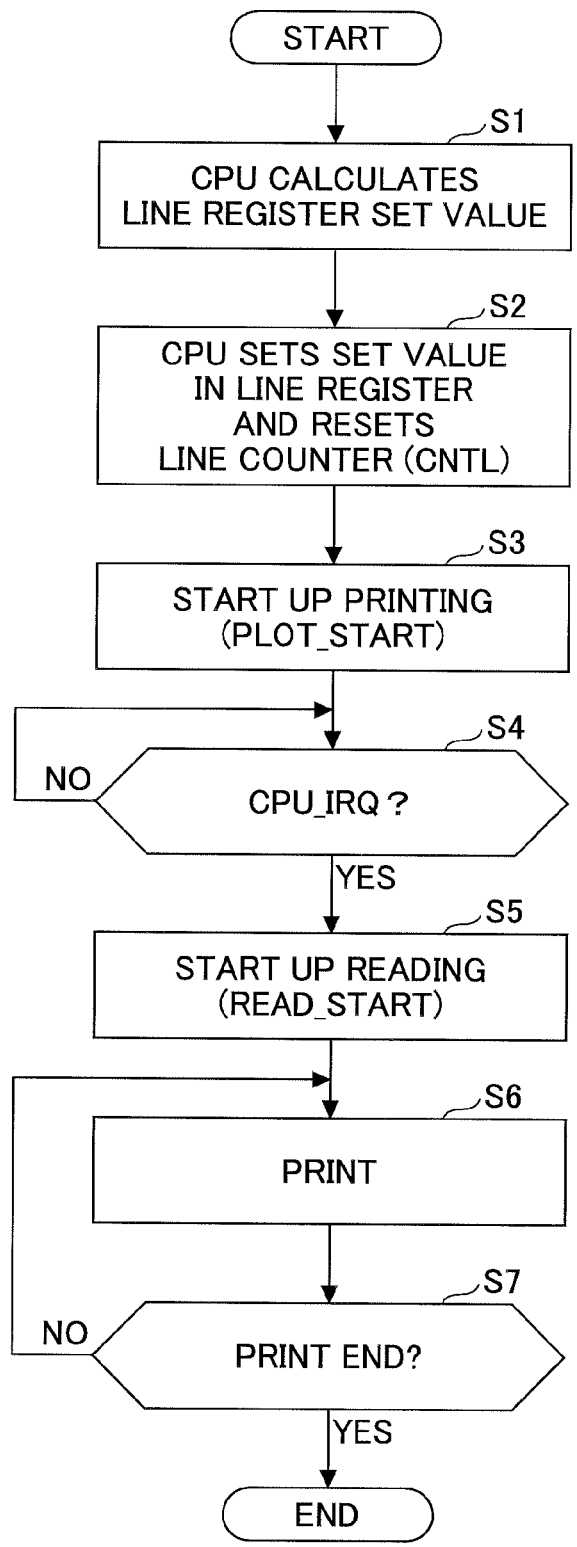
FIG. 23 shows a flow chart concerning control of operation of an image forming apparatus in each embodiment of the present invention.

FIG. 23 shows a flow chart of control of carrying out producing a printed image in the configuration described above of the embodiment 1. This control is carried out by the CPU 1001 when the CPU 1001 executes a program previously stored in the first MEM 122.

First, when printing is started, a value to set in the LINE 31 is calculated by the CPU 1001 (step S1).

Next, in step S2, the thus-calculated value is actually set in the LINE 31 of FIG. 7. At the same time, a reset signal res_cnt1 is activated, and the count value of the CNTL 32 of FIG. 7 is reset to zero.

Then, a printing process is actually started in step S3. Thus, the plot data previously stored in the first MEM 122 is transferred to the second MEM 11. At this time, the count value of the CNTL 32 (representing the number of lines of the plot data already transferred) is increased one-by-one accordingly, as a result of an increment signal inc_cnt1 of the CNTL 32 being activated.

In this state, it is necessary to wait for when the plot data thus transferred to the second MEM 11 from the first MEM 122 reaches the value set in the LINE 31. When the plot data thus transferred to the second MEM 11 from the first MEM 122 reaches the value set in the LINE 31, the above-mentioned interrupt signal CPU_IRQ is provided to the CPU 1001 (Step S4). In response thereto, the CPU 1001 activates the starting-up signal READ_START for starting transfer of the plot data from the second MEM 11 to the side of the image forming unit 106 in the path 'c' of FIG. 8 (step S5). Thus, an actual printing process is started (step S6). Then, when producing of a printed image of a predetermined size is finished by means of the image forming unit 106 consequently, this control is finished (YES of step S7).

Figure 13:
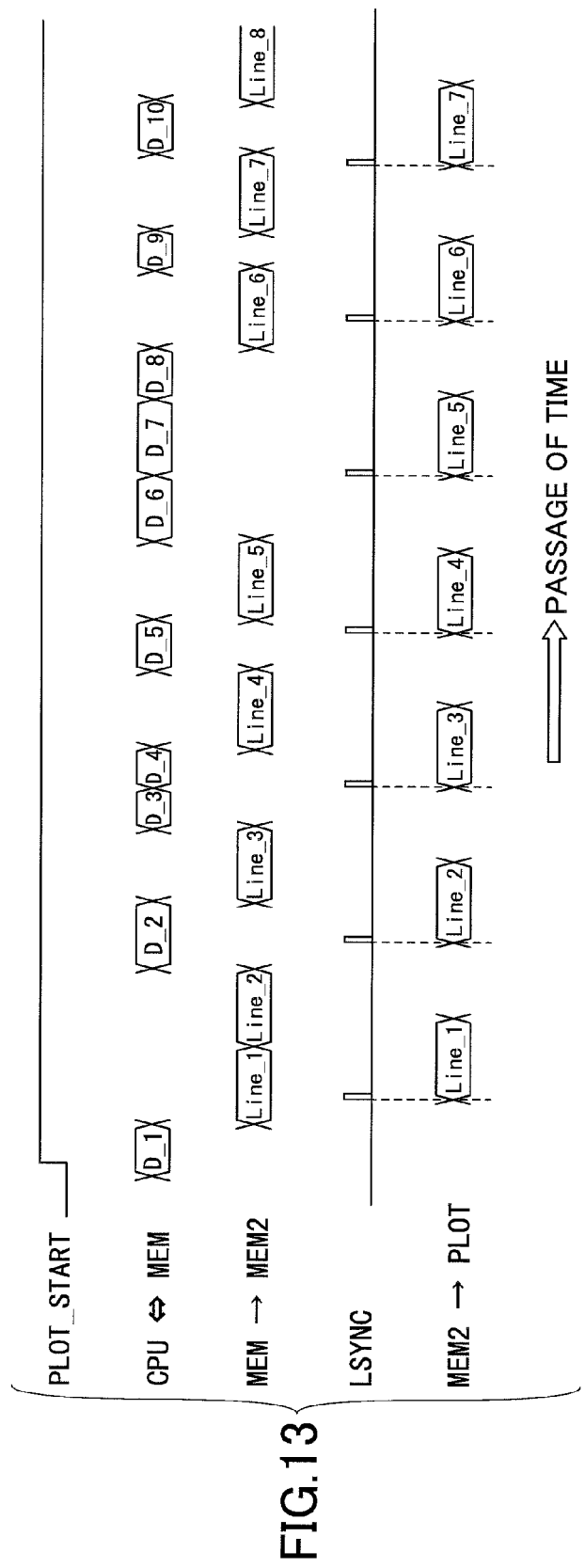
FIG. 13 shows a state where data access is carried out frequently from a CPU to a first MEM.

FIG. 13 shows a state in which, in the above-described configuration of the embodiment 1, a printing process is carried out while the plot data is read and transferred from the first MEM 122, in a condition in which data access by the CPU 1001 to the first MEM 122 occurs frequently, resulting in congestion of data transfer between the MCH 1003 and the first MEM 122.

For example, when a cache miss of the CPU 1001 or such occurs as mentioned above, data transfer between the CPU 1001 and the first MEM 122 occurs frequently. Thereby, for example, in the above-mentioned configuration for a comparative example, as shown in FIG. 9B as mentioned above, line data of the plot data might not be transferred within a predetermined writing LSYNC period, and as a result, a defective printed image as shown in FIG. 10B or 10C might be obtained. However, in the embodiment 1 described above, even when data transfer between the CPU 1001 and the first MEM 122 occurs frequently by transfer of data D_6, D_7 and D_8 shown in FIG. 13, the predetermined data transfer rate of the plot data can be positively achieved as a result of each line data of the plot data being able to be transferred within the predetermined writing LSYNC period. This is because, as mentioned above in the embodiment 1, the plot data is once stored in the second MEM 11, and then, the plot data is read from the second MEM 11 in appropriate timing as mentioned above with reference to FIGS. 11 and 12.

Thus, in the embodiment 1, even when data access of the CPU 1001 to the first MEM 122 occurs frequently (because of a process of exchanging data in the cache memory or another process), the plot data is transferred to the side of the image forming unit 106 at the same time, and no defect occurs in a printed image obtained on a printing paper sheet in a printing process. Thus, it is possible to obtain a printed image without defect at any time.

An embodiment 2 of the present invention will now be described.

Figure 14:
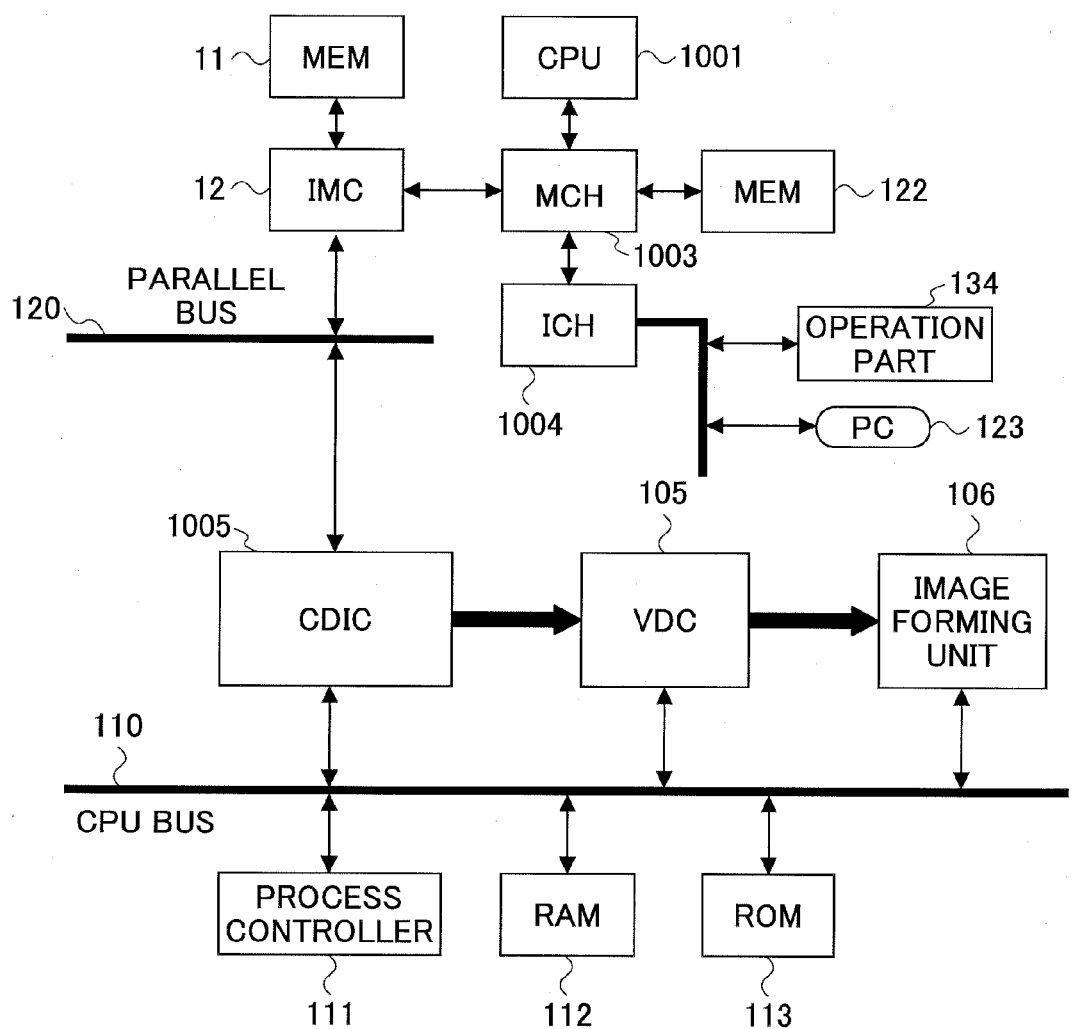
FIG. 14 shows a block diagram of an image forming apparatus in an embodiment 2 of the present invention.

FIG. 14 shows a block diagram of the embodiment 2 in which, with the use of the side of the controllers of the configuration of the above-mentioned embodiment 1, a configuration of a printer is provided. The embodiment 2 is different from the embodiment 1 in that, the reading unit 101 and the SBU 102 of a scanner reading mechanism are omitted. Further, in the embodiment 2, instead of the CDIC 103 and the IPP 104, a second CDIC 1005 is provided for controlling data transfer between the CPU bus 110 and the VDC 105. Thereby, the configuration of the printer without the scanner reading mechanism is obtained in the embodiment 2.

Figure 15:
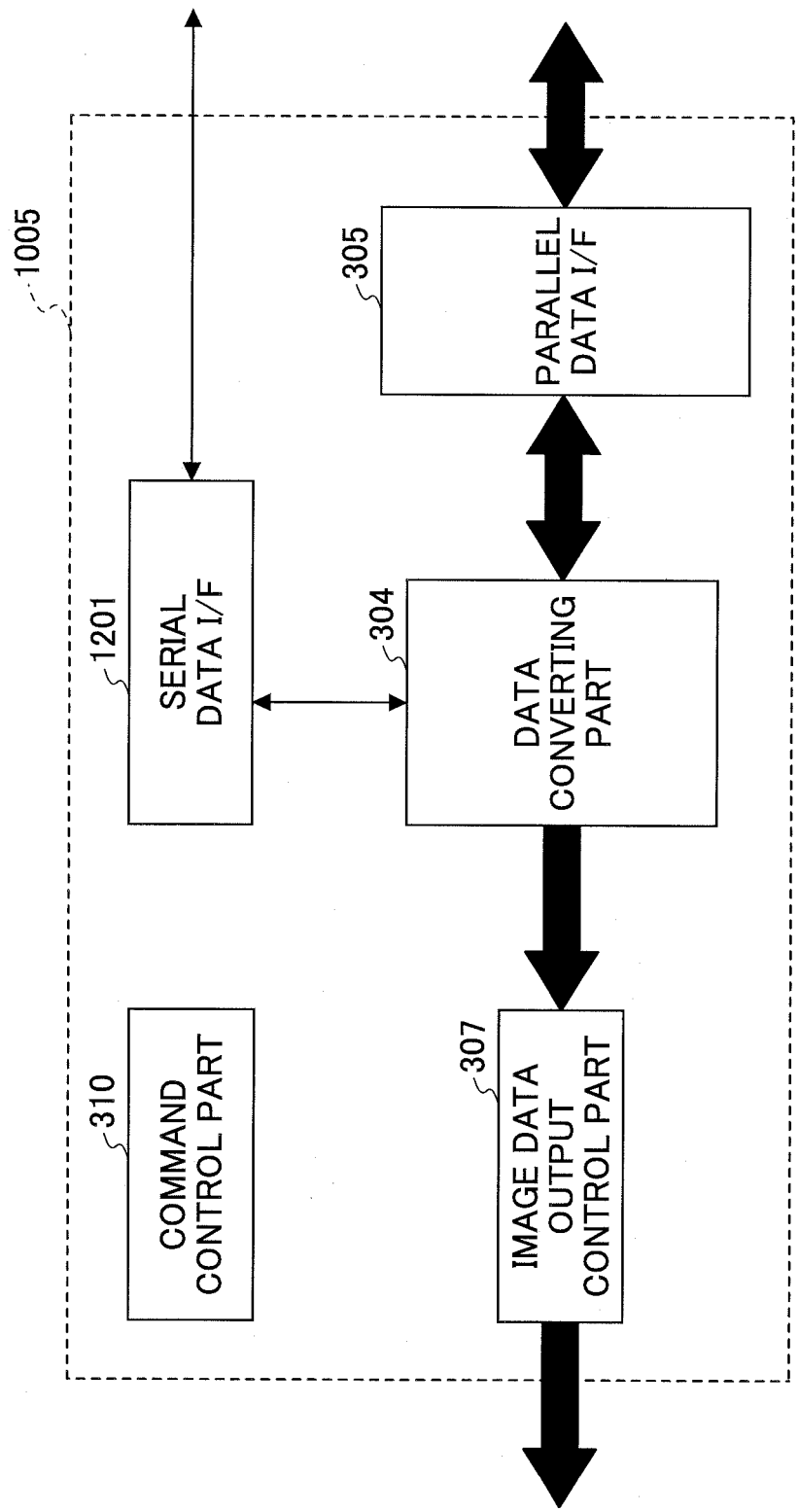
FIG. 15 shows a configuration of a second CDIC of FIG. 14.

FIG. 15 shows a block diagram of a configuration of the second CDIC 1005 of FIG. 14. The second CDIC 1005 includes a parallel data I/F 305, a data converting part 304, an image data output control part 307, a serial data I/F 1201 and a command control part 310. The CDIC 1005 is different from the CDIC 103 described above with reference to FIG. 3 in the embodiment 1 in that the second CDIC 1005 of the embodiment 2 provides an interface between the parallel bus 120, the CPU bus 110 and the VDC 105 while the CDIC 103 provides an interface between the parallel bus 120, the CPU bus 110, the SBU 102 and the IPP 104.

Figure 16:
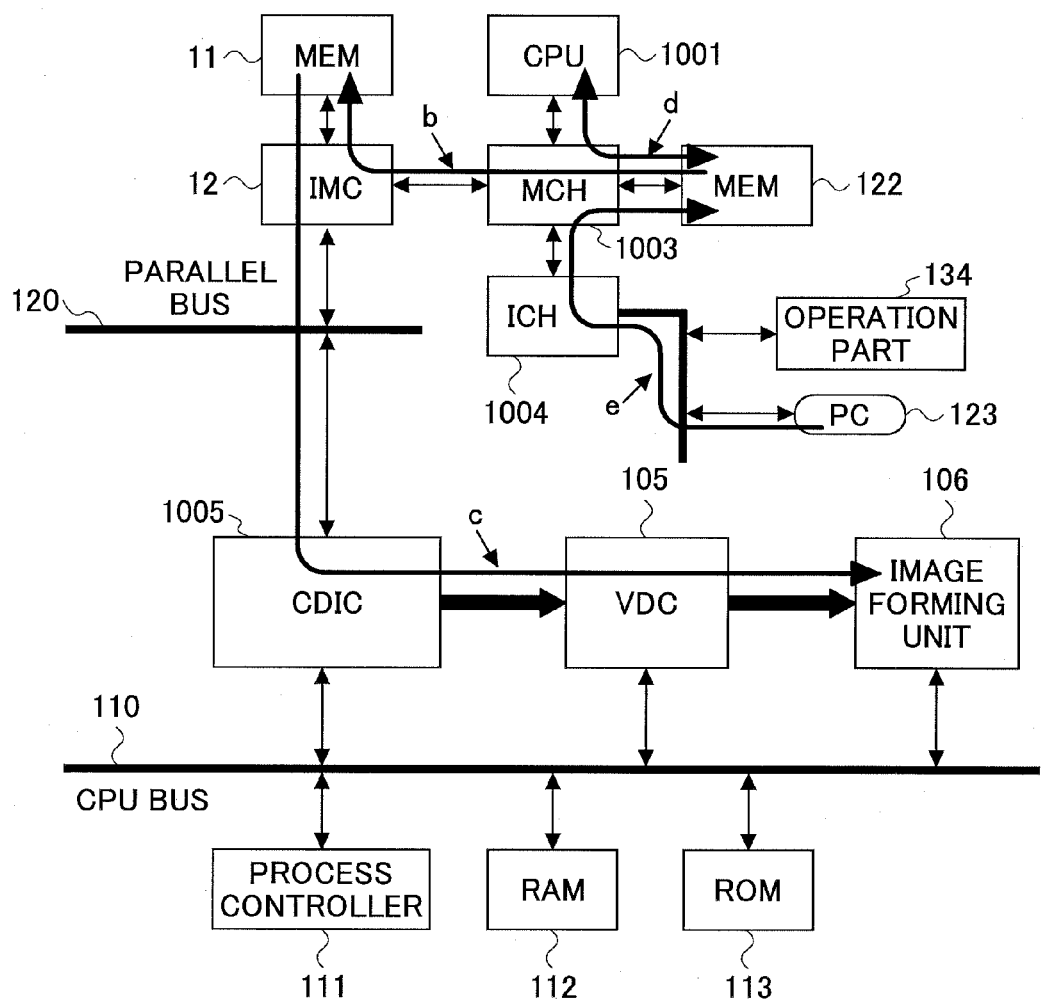
FIG. 16 shows a flow of data when printing is carried out from a PC in a configuration of a printer shown in FIG. 14.

FIG. 16 shows a flow of data in the printer configuration of FIG. 14, for a case of printing from the PC 123. The same as the embodiment 1, when printing is started, in a path 'b' of plot data, the plot data read out from the first MEM 122 is transferred to the MCH 1003 and the IMC 12. Then, the plot data is once stored in the second MEM 11. After that, in a path 'c', the plot data is read out from the second MEM 11, is then transferred through the IMC 12, the parallel bus 120, the second CDIC 1005 and the VDC 105, to the image forming unit 106. Then, a printed image is obtained from the image forming unit 106 on a printing paper sheet.

A path 'e' of FIG. 16 shows a flow of plot data when the plot data is taken from the PC 123. In this case, the plot data is transferred through the ICH 1004 and the MCH 1003, to the first MEM 122 which then stores the plot data first. A path 'd' of FIG. 16 shows data transfer when the CPU 1001 carries out another process with the use of the first MEM 122 as a work memory at the same time.

Also in the embodiment 2, the same as in the embodiment 1 described above, by control described above with reference to FIG. 23 and so forth, even when data access from the CPU 1001 to the first MEM 122 occurs frequently, the plot data is transferred to the side of the image forming unit 106 at the same time, and no defect occurs in a printed image obtained on a printing paper sheet in a printing process in the same manner as that in the embodiment 1. Thus, it is possible to obtain a printed image without defect at any time.

Thus, according to each embodiment of the present invention, the second MEM 11 acting as a buffer memory is connected to the IMC 12 which is connected to the peripheral devices of the CPU 1001. The plot data is once stored in the second MEM 11. Then, when a printing process is started, the plot data is read from the second MEM 11. As a result, when a cache miss of a program or data occurs in the CPU 1001 for example, whereby data access to the first MEM 122 by the CPU 1001 occurs frequently, the predetermined data transfer rate of the plot data to the side of the image forming unit 106 can be ensured in a printing process. Thus, each line data of the plot data can be positively transferred within the predetermined writing LSYNC period. As a result, it is possible to obtain a printed image consequently obtained on a printing paper sheet without any defect.

Further, according to each embodiment, the number of lines stored in the second MEM 11 is monitored while the plot data is transferred to the second MEM 11 from the first MEM 122, and then, a start of reading from the second MEM 11 can be automatically carried out by hardware as described above with reference to FIG. 7. Thus, it is possible to reduce participation of software, whereby the control can be simplified.

Further, according to each embodiment, the number of lines stored in the second MEM 11 is monitored while the plot data is transferred to the second MEM 11 from the first MEM 122, and then, the CPU 1001 is informed that a condition of a start of reading from the second MEM 11 is met with an interrupt signal. In response thereto, the CPU 1001 starts a printing process. Thus, control for a start of a printing process can be simplified.

Figure 18:
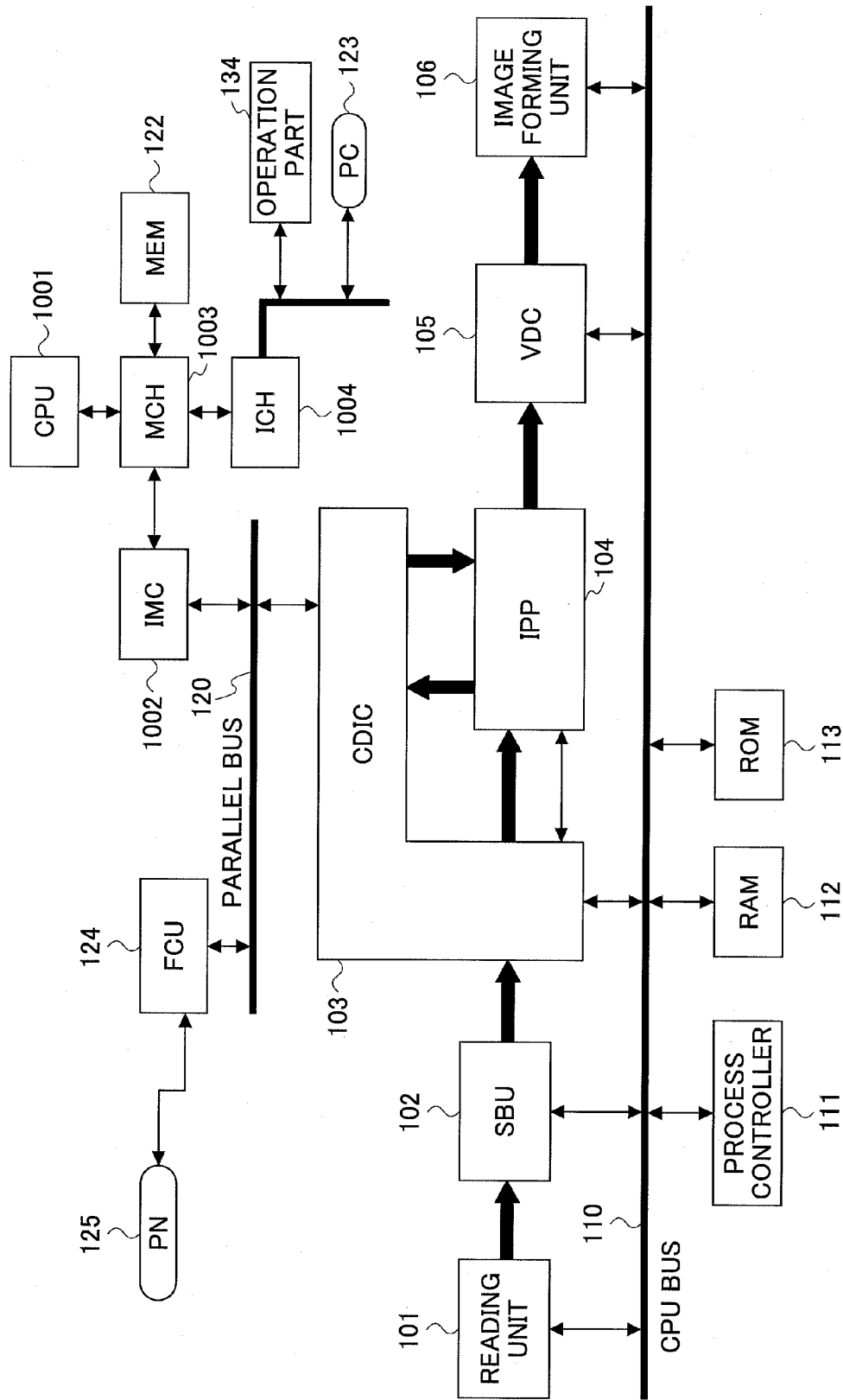
FIG. 18 shows a comparative example to the embodiment 1.
Figure 19:
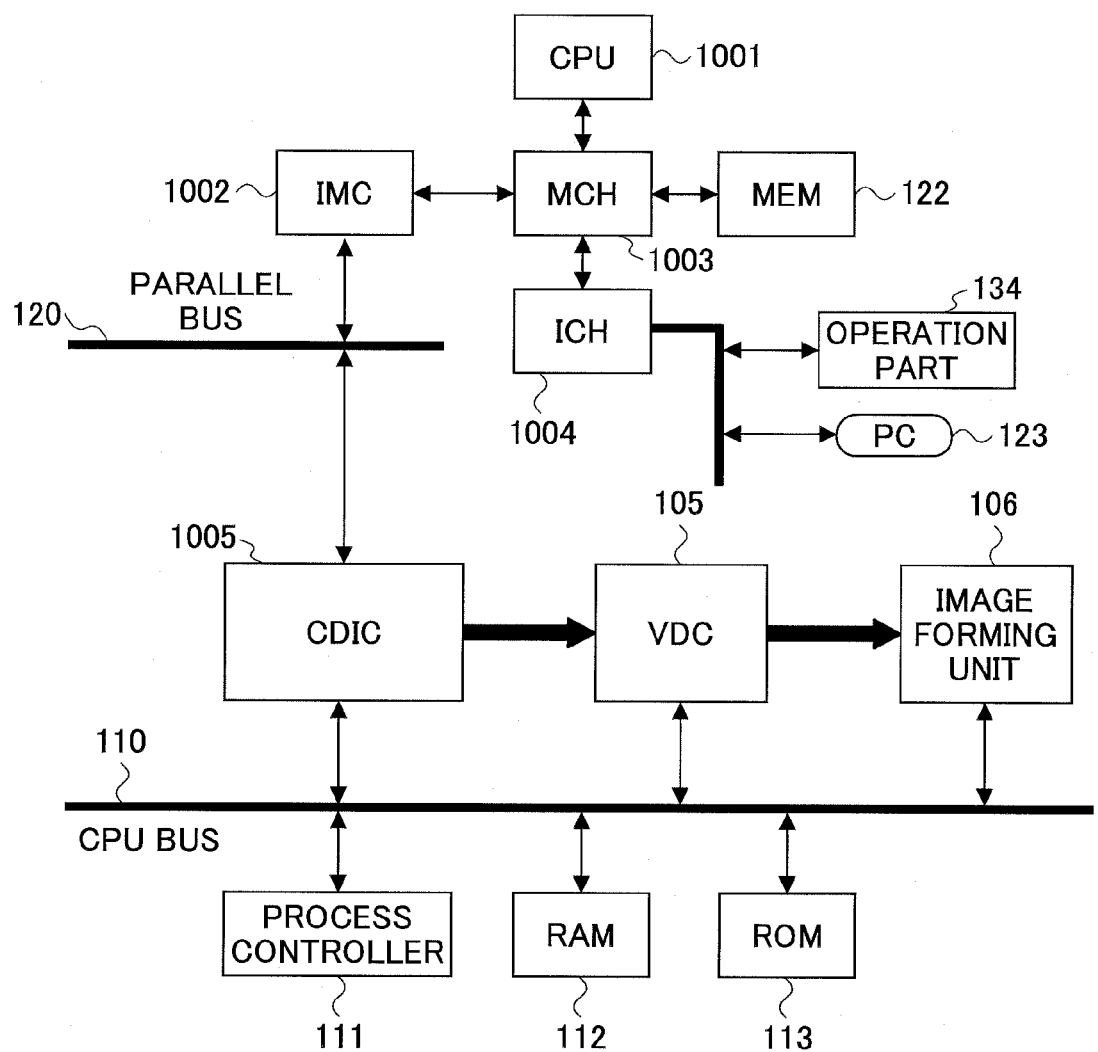
FIG. 19 shows a comparative example to the embodiment 2.
Figure 20:
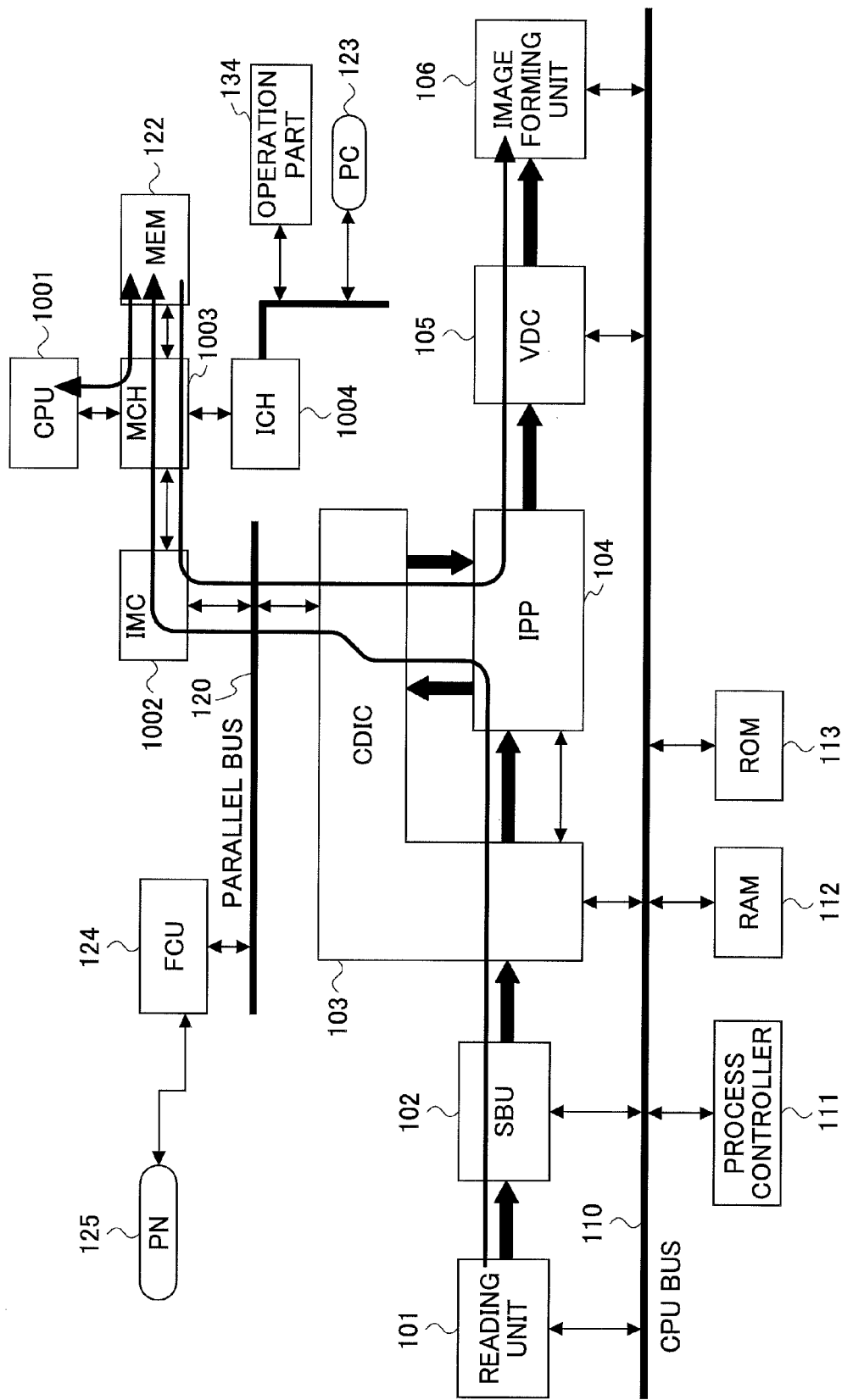
FIG. 20 shows a flow of data in a configuration of FIG. 18.
Figure 21:
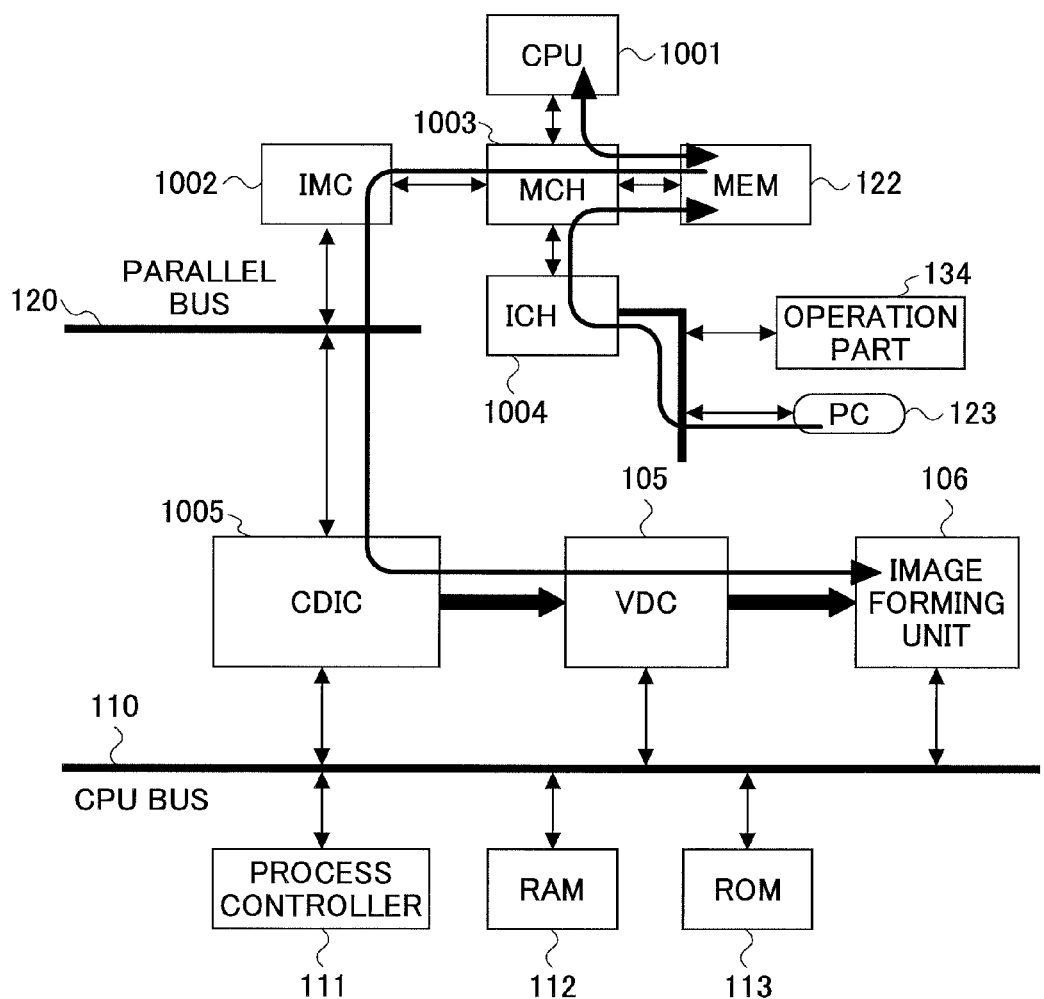
FIG. 21 shows a flow of data in a configuration of FIG. 19.

For the purpose of illustrating functions of the embodiments 1 and 2, FIGS. 18 and 19 show circuit configurations in each of which the second MEM 11 were omitted for comparative examples to the embodiments 1 and 2, respectively. In these circuit configurations for comparative examples, as shown in FIGS. 20 and 21, the above-mentioned path 'b' between the first MEM 122 and the second MEM 11 could not be provided. Thus, when the CPU 1001 frequently accesses the first MEM 122 while the plot data is transferred from the first MEM 122 to the side of the image forming unit 106 at the same time, data transfer between the first MEM 122 and the MCH 1003 is in congestion. Thereby, the data transfer from the first MEM 122 to the side of the image forming unit 106 might be obstructed, and thus, data transfer of each line data of the plot data to the side of the image forming unit 106 might not be achieved within a predetermined writing LSYNC period. As a result, it might not be possible to guarantee obtaining a normal printed image as shown in FIG. 10A as in the embodiment 1 or 2, and a defect would occur in a printed image consequently obtained on a printing paper sheet as shown in FIG. 10A or 10B.

The present invention is not limited to the specifically disclosed embodiments, and variations and modifications may be made without departing from the scope of the present invention.

What is claimed is:

1. An image forming apparatus for obtaining an image comprising:
   a first control part;
   a first storing part provided to the first control part, said first control part being configured to control storing of image data in the first storing part and control a data transfer between the first storing part and a second control part;
   a writing engine for forming an image based on the image data;
   a second storing part configured to receive line data of the image data from the first storing part and store the image data; and
   an image control part configured to manage addresses of the first storing part when the first storing part stores the image data, and including a line counter configured to count the line data to be stored in the second storing part,
   wherein the first control part is configured to control the image control part so as to control storing of a part of the image data stored in the first storing part into the second storing part;
   the image control part is configured to start reading the image data from the second storing part for starting image forming operation, when data stored in the second storing part reaches a data amount so that the image data is continuously transferred to the writing engine from the second storing part at a predetermined transfer rate, and
   the image control part is further configured to obtain the data amount according to a length of time which a data access between the second control part and the first storing part requires and a size of sheet on which the image is formed.

2. The image forming apparatus as claimed in claim 1, wherein:
   the image control part starts reading of the image data from the second storing part to provide the image data to the writing engine when the image data stored in the second storing part reaches a predetermined number of lines after data transfer of the line data from the first storing part to the second storing part is started in response to an image forming start directing signal.

3. The image forming apparatus as claimed in claim 2, wherein:
   an interrupt signal is output from the first control part when the image data stored in the second storing part reaches the predetermined number of lines, and the image control part starts reading of the image data from the second storing part in response to the interrupt signal.

4. The image forming apparatus as claimed in claim 1, further comprising:
a common bus through which access to the first storing part by the first control part which controls operation of the image forming apparatus is carried out, and also, through which transfer of the line data to the second storing part from the first storing part is carried out, wherein:
the predetermined delay occurring in transfer operation of the line data to the second storing part from the first storing part comprises a delay occurring because the access to the first storing part by the first control part and the transfer of the line data to the second storing part from the first storing part are carried out at the same time.

5. The image forming apparatus as claimed in claim 1, wherein the image control part further includes:
a line register for storing a number of lines at which the image control part starts reading the image data from the second storing part, and
a comparator for comparing the number of lines stored in the line register and the number of lines counted by the line counter.

6. The image forming apparatus as claimed in claim 1, wherein the first storing part is a main memory as a work memory of the second control part of the image forming apparatus, and wherein the image data is stored initially in the first storing part.

7. The image forming apparatus as claimed in claim 5, wherein the number of lines at which the image control part starts reading the image data from the second storing part is stored in the line register when the first control part sets the data amount of the line data according to the size of sheet on which the image is formed when the image forming operation is started.

8. The image forming apparatus as claimed in claim 1, wherein the second control part is configured to determine the amount data based on a printing time for the sheet of the size, a data amount of one line for the sheet of the size, a transfer rate from the first storing part to the first control part to continuously print the image data on the sheet of the size, and an predicted reduced transfer rate thereof.

9. The image forming apparatus as claimed in claim 1, wherein the second storing part is formed as one unit.

10. An image forming method in an image forming apparatus, comprising:
a first storing step of storing image data in a first storing part provided to a first control part when an image control part manages addresses of the first storing part, said first control part being configured to control storing of the image data in the first storing part and control a data transfer between the first storing part and a second control part, and
a transferring step of transferring the image data stored in the first storing part to a writing engine, for obtaining an image from the writing engine,
wherein said image forming method further comprises:
a second storing step for receiving line data of the image data from the first storing part and storing the image data in a second storing part, said first control part being configured to control the image control part so as to control storing of a part of the image data stored in the first storing part into the second storing part, said image control part including a line counter configured to count the line data to be stored in the second storing part;
a reading step of starting reading of the image data from the second storing part for starting image forming operation when data stored in the second storing part reaches a data amount so that the image data is continuously transferred to the writing engine from the second storing part at a predetermined transfer rate; and
an obtaining step of obtaining the data amount according to a length of time which a data access between the second control part and the first storing part requires and a size of sheet on which the image is formed.

11. The image forming method as claimed in claim 10, wherein:
the reading step starts reading the image data from the second storing part to provide the image data to the writing engine when the image data stored in the second storing part reaches a predetermined number of lines after data transfer of the line data from the first storing part to the second storing part is started in response to an image forming start directing signal.

12. The image forming method as claimed in claim 11, wherein:
an interrupt signal is output from the first control part when the image data stored in the second storing part reaches the predetermined number of lines, and
the reading step is started to read the image data from the second storing part in response to the interrupt signal.

13. The image forming method as claimed in claim 10, wherein:
the image forming apparatus has a common bus through which access to the first storing part by the first control part which controls operation of the image forming apparatus is carded out, and also, through which transfer of the line data to the second storing part from the first storing part is carried out, and
a predetermined delay occurring in the transfer operation of the line data to the second storing part from the first storing part comprises a delay occurring because the access to the first storing part by the first control part and the transfer of the line data to the second storing part from the first storing part are carried out at the same time.

14. A non-transitory computer readable information recording medium storing a program which, when executed by one or more processors of an image forming apparatus, carries out an image forming method comprising the steps of:
a first storing step of storing image data in a first storing part provided to a first control part when an image control part manages addresses of the first storing part, said first control part being configured to control storing of the image data in the first storing part and control a data transfer between the first storing part and a second control part, and
a transferring step of transferring the image data stored in the first storing part to a writing engine, for obtaining an image from the writing engine,
wherein said image forming method further comprises:
a second storing step for receiving line data of the image data from the first storing part and storing the image data in a second storing part, said first control part being configured to control the image control part so as to control storing of a part of the image data stored in the first storing part into the second storing part, said image control part including a line counter configured to count the line data to be stored in the second storing part;
a reading step of starting reading the image data from the second storing part for starting image forming operation, when data stored in the second storing part reaches a data amount so that the image data is continuously transferred to the writing engine from the second storing part at a predetermined transfer rate; and an obtaining step of obtaining the data amount according to a length of time which a data access between the second control part and the first storing part requires and a size of sheet on which the image is formed.

15. The non-transitory computer readable information recording medium as claimed in claim 14, wherein:

said program starts the reading step to read the image data from the second storing part to provide the image data to the writing engine when the image data stored in the second storing part reaches a predetermined number of lines after data transfer of the line data from the first storing part to the second storing part is started in response to an image forming start directing signal.

16. The non-transitory computer readable information recording medium as claimed in claim 15, wherein:

said program causes an interrupt signal to be output from the side of the first control part when the image data stored in the second storing part reaches the predetermined number of lines, and said program starts the reading step to read the image data from the second storing part in response to the interrupt signal.

17. The non-transitory computer readable information recording medium as claimed in claim 14, wherein:

the image forming apparatus has a common bus through which access to the first storing part by the first control part which controls operation of the image forming apparatus is carried out, and also, through which transfer of the line data to the second storing part from the first storing part is carried out, and a predetermined delay occurring in the transfer operation of the line data to the second storing part from the first storing part comprises a delay occurring because the access to the first storing part by the first control part and the transfer of the line data to the second storing part from the first storing part are carried out at the same time.

* * * * *

UNITED STATES PATENT AND TRADEMARK OFFICE
CERTIFICATE OF CORRECTION

| | | |
|---|---|---|
| PATENT NO. | : 8,599,416 B2 | Page 1 of 1 |
| APPLICATION NO. | : 13/410524 | |
| DATED | : December 3, 2013 | |
| INVENTOR(S) | : Sugitaka Oteki | |

It is certified that error appears in the above-identified patent and that said Letters Patent is hereby corrected as shown below:

On the Title Page, Item (63): Related U.S. Application Data should be entered.

Add Item (63): Related U.S. Application Data as follows:

Continuation of application No. 12/149,120, filed on Apr. 28, 2008, now Pat. No. 8,154,759

Signed and Sealed this
Fifteenth Day of April, 2014

Michelle K. Lee
*Deputy Director of the United States Patent and Trademark Office*